US011221101B2

(12) United States Patent
Yang et al.

(10) Patent No.: US 11,221,101 B2
(45) Date of Patent: Jan. 11, 2022

(54) PRODUCT-DISPLAY SYSTEM

(71) Applicant: Apple Inc., Cupertino, CA (US)

(72) Inventors: Sheng Yang, Mountain View, CA (US);
Eric W. Wang, Newark, CA (US);
Steven C. Michalske, Sunnyvale, CA (US); Olivia Ching, Mountain View, CA (US); Clayton R. Woosley, San Jose, CA (US); Samuel Wing Man Yuen, Cupertino, CA (US); Paul Joseph Hack, San Jose, CA (US);
Ricardo A. Mariano, Hayward, CA (US); Chien Tsun Chen, Taipei (TW);
George Tziviskos, Cupertino, CA (US);
Charles A. Schwalbach, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 16/805,185

(22) Filed: Feb. 28, 2020

(65) Prior Publication Data

US 2020/0400268 A1 Dec. 24, 2020

Related U.S. Application Data

(60) Provisional application No. 62/864,773, filed on Jun. 21, 2019, provisional application No. 62/907,309, filed on Sep. 27, 2019.

(51) Int. Cl.
*A47F 7/024* (2006.01)
*F16M 11/12* (2006.01)
(Continued)

(52) U.S. Cl.
CPC ........... *F16M 11/12* (2013.01); *A47F 7/0246* (2013.01); *F16M 11/041* (2013.01); *G08B 13/1463* (2013.01); *F16M 2200/065* (2013.01)

(58) Field of Classification Search
CPC ..... A47F 7/024; A47F 7/0246; F16M 11/041; F16M 11/12; F16M 2200/065; G08B 13/1463
See application file for complete search history.

(56) References Cited

U.S. PATENT DOCUMENTS

| D244,857 S | 6/1977 | Hayes |
|---|---|---|
| 4,066,231 A | 1/1978 | Bahner et al. |

(Continued)

FOREIGN PATENT DOCUMENTS

| CN | 201489627 U | 5/2010 |
|---|---|---|
| CN | 201814222 U | 5/2011 |

(Continued)

OTHER PUBLICATIONS

International Search Report issued in International Application No. PCT/US2020/027962, dated Jun. 5, 2020, 3 pages.

(Continued)

*Primary Examiner* — Bradley Duckworth
(74) *Attorney, Agent, or Firm* — Sterne, Kessler, Goldstein & Fox P.L.L.C

(57) ABSTRACT

A product-display system for displaying and securing a retail product. The system may include a retainer having a retainer bracket and a retainer body coupled to the retainer bracket. A retaining cable may be coupled to the retainer body at an opening in the retainer body. A fastener that may be unfastened to release the product from the retainer may only be accessed through the opening of the retainer body such that when the retaining cable is coupled to the opening, no fasteners of the retainer may be visible or accessible. The system may also include a display stem for holding the retainer and product. The display stem may include a recess for receiving at least a portion of the retainer body. The retaining cable may extend through the display stem and may simultaneously transmit power and data to a displayed (Continued)

product. The retainer may be returned to and held on top of the display stem using a retaining cable. The retainer may be oriented on top of the display stem in one or more predetermined positions through the use of magnetic forces.

30 Claims, 23 Drawing Sheets

(51) Int. Cl.
*F16M 11/04* (2006.01)
*G08B 13/14* (2006.01)

(56) References Cited

U.S. PATENT DOCUMENTS

| | | | |
|---|---|---|---|
| D314,501 S | 2/1991 | Pagano | |
| 5,604,484 A | 2/1997 | Rogers | |
| D407,408 S | 3/1999 | Hoff | |
| 5,906,031 A | 5/1999 | Jensen | |
| 6,234,703 B1 | 5/2001 | Bieg et al. | |
| 6,476,717 B1 | 11/2002 | Gross et al. | |
| D510,358 S | 10/2005 | Ezure | |
| 7,154,039 B1 | 12/2006 | Marszalek et al. | |
| 7,209,038 B1 | 4/2007 | Deconinck et al. | |
| D542,279 S | 5/2007 | Chan | |
| D545,826 S | 7/2007 | Richter | |
| 7,287,652 B2 | 10/2007 | Scholen et al. | |
| D589,962 S | 4/2009 | Maruyama et al. | |
| D590,187 S | 4/2009 | Barabas et al. | |
| D599,241 S | 9/2009 | Andre et al. | |
| 7,614,601 B2 | 11/2009 | Marsillio et al. | |
| D612,837 S | 3/2010 | Murray | |
| 7,710,266 B2 | 5/2010 | Belden, Jr. et al. | |
| 7,724,135 B2 | 5/2010 | Rapp et al. | |
| 7,740,214 B2 | 6/2010 | Marsilio et al. | |
| 7,748,669 B2 | 7/2010 | Lu et al. | |
| D628,203 S | 11/2010 | Noble | |
| D629,405 S | 12/2010 | Crysell | |
| D645,047 S | 9/2011 | Wike | |
| 8,020,816 B2 | 9/2011 | Laitila et al. | |
| D652,422 S | 1/2012 | Cheng | |
| 8,087,625 B2 | 1/2012 | Chang | |
| 8,145,821 B2 | 3/2012 | Mead et al. | |
| D663,972 S | 7/2012 | Alexander et al. | |
| D696,259 S | 12/2013 | Howarth et al. | |
| D696,674 S | 12/2013 | Vogel | |
| 8,602,376 B2 | 12/2013 | Vogel et al. | |
| D704,199 S | 5/2014 | Byun | |
| 8,749,387 B2 | 6/2014 | Fawcett et al. | |
| D709,066 S | 7/2014 | Byun | |
| 8,814,128 B2 | 8/2014 | Trinh et al. | |
| 8,900,009 B2 | 12/2014 | Hornick et al. | |
| 9,019,698 B2 * | 4/2015 | Thiers | F16M 11/2014 |
| | | | 361/679.3 |
| 9,097,379 B1 | 8/2015 | Strasser et al. | |
| 9,303,809 B2 | 4/2016 | Reynolds et al. | |
| 9,397,719 B1 * | 7/2016 | Schmidt | F16M 13/04 |
| 9,474,392 B2 | 10/2016 | Howarth et al. | |
| 9,499,373 B1 * | 11/2016 | Kim | B65H 75/4428 |
| 10,206,522 B2 | 2/2019 | Yang et al. | |
| 10,624,471 B2 * | 4/2020 | Galant | F16M 11/12 |
| 2007/0114346 A1 | 5/2007 | Omps | |
| 2007/0145211 A1 | 6/2007 | Marsilio et al. | |
| 2008/0169923 A1 | 7/2008 | Belden et al. | |
| 2009/0079566 A1 | 3/2009 | Goldstein et al. | |
| 2009/0173863 A1 | 7/2009 | Crown | |
| 2009/0229089 A1 | 9/2009 | Galant | |
| 2011/0036960 A1 | 2/2011 | Li | |
| 2011/0047844 A1 | 3/2011 | Fawcett et al. | |
| 2011/0068919 A1 | 3/2011 | Rapp et al. | |
| 2011/0084838 A1 | 4/2011 | Fawcett | |
| 2011/0187531 A1 | 8/2011 | Oehl et al. | |
| 2011/0309934 A1 | 12/2011 | Henson et al. | |
| 2012/0037783 A1 | 2/2012 | Alexander et al. | |
| 2012/0188082 A1 | 7/2012 | Berglund et al. | |
| 2012/0205326 A1 * | 8/2012 | Richter | A47F 7/024 |
| | | | 211/4 |
| 2012/0280810 A1 | 11/2012 | Wheeler | |
| 2013/0026309 A1 | 1/2013 | Ball et al. | |
| 2013/0134287 A1 | 5/2013 | Gresset | |
| 2014/0060218 A1 | 3/2014 | Bisesti et al. | |
| 2014/0106608 A1 | 4/2014 | Howarth et al. | |
| 2014/0226298 A1 | 8/2014 | Palmer et al. | |
| 2015/0208826 A1 * | 7/2015 | Yang | A47F 7/0246 |
| | | | 248/551 |
| 2020/0141159 A1 * | 5/2020 | Berglund | E05B 65/00 |

FOREIGN PATENT DOCUMENTS

| | | |
|---|---|---|
| CN | 203016422 U | 6/2013 |
| CN | 204378633 U | 6/2015 |
| GB | 2481370 A | 12/2011 |
| TW | M463084 U | 10/2013 |
| WO | 2018222674 A1 | 12/2018 |

OTHER PUBLICATIONS

Written Opinion of the International Searching Authority issued in International Application No. PCT/US2020/027962, dated Jun. 5, 2020, 8 pages.
Photograph believed taken before Jan. 8, 2014.
Notification of Transmittal of the International Search Report and the Written Opinion of the International Searching Authority, or the Declaration in PCT/US2015/012467, dated Jul. 20, 2015, 18 pages.

* cited by examiner

PRODUCT-DISPLAY SYSTEM

CROSS-REFERENCE TO RELATED APPLICATIONS

This application claims priority to U.S. Provisional Patent Application No. 62/864,773, filed Jun. 21, 2019, titled "Product-Display System" and to U.S. Provisional Patent Application No. 62/907,309, filed Sep. 27, 2019, titled "Product-Display System," each of which is incorporated herein in its entirety by reference thereto.

FIELD

The described embodiments relate generally to product-display systems. More particularly, the embodiments relate to product-display systems for displaying and securing retail products.

BACKGROUND

A retailer or other person may desire to make a product available for use (e.g., for testing) by a potential purchaser or other person. In some cases, the retailer may further desire to limit the potential purchaser's ability to remove the product from a display area.

SUMMARY

Various embodiments are disclosed that relate to product-display systems for displaying products to potential purchasers in a visually-appealing manner. Such product-display systems may also make the displayed products available for use (e.g., for testing) by potential purchasers while limiting the potential purchaser's ability to remove the product from a display area. For example, embodiments include a product-display system having a retainer bracket with at least two arms that extend around opposing sides of a displayed product. The product-display system may also include a retainer body that has an edge and has a continuous, smooth outer surface extending from the edge. The retainer body may be coupled to the retainer bracket at a portion of the retainer body on an opposite side of the edge from the smooth outer surface. The product-display system may also include a retaining cable that may be coupled to the retainer body at an opening of the retainer body through the outer surface of the retainer body. The smooth outer surface of the retainer body may extend continuously from the opening to the edge.

Embodiments also include a product-display system having a retainer for retaining a displayed product. The retainer may include a retainer body, and the retainer body may include a magnet array. The magnet array may include a first plurality of magnets that are disposed radially around a central axis. The first plurality of magnets may have alternating positive and negative polar orientations, and the magnetic axis of each of the magnets in the first plurality of magnets may be disposed in a radial direction relative to the central axis. The magnet array may also include a second plurality of magnets that are disposed radially around the central axis. The second plurality of magnets may have alternating positive and negative polar orientations, and the magnetic axis of each of the magnets in the second plurality of magnets may be disposed in a tangential direction relative to the central axis. Further, the first plurality of magnets may be disposed adjacent to magnets of the second plurality of magnets, where at least one second magnet may be disposed between two first magnets, and where at least one first magnet may be disposed between two second magnets. The product-display system may also include a display stem having a recess configured to receive the retainer, and the display stem may also include a magnet array. Magnetic interaction between the magnet array of the retainer body and the magnet array of the display stem may cause rotation of the retainer to at least one predefined orientation when at least a portion of the retainer is disposed within the recess of the display stem, if the retainer is not in the predefined orientation.

Embodiments also include a product-display system having a retainer for retaining a displayed product. The product-display system may also include a cable-retraction unit that having a cable spool and a cable-biasing mechanism. The product-display system may also include a retaining cable having a first end coupled to the retainer and a second end coupled to the cable-retraction unit. The retaining cable may be spirally wound onto the cable spool in a single layer and the cable-biasing mechanism may provide a constant tension to the cable as it is wound and unwound from the cable spool.

Embodiments also include a product-display system having a retainer, where the retainer includes a retainer bracket and a retainer body coupled to the retainer bracket. The retainer bracket may be configured to secure a displayed product. The retainer body may include an edge, an opening, and a smooth outer surface extending continuously from the edge to the opening. The product-display system may also include a display stem having a recess that is configured to receive the retainer body. Magnetic interaction between a magnet array of the retainer body and a magnet array of the display stem may cause rotation of the retainer to at least one predefined orientation when at least a portion of the retainer body is disposed within the recess of the display stem, if the retainer body is not in the predefined orientation. The product-display system may also include a retaining cable extending through the display stem and having a first end coupled to the retainer body at the opening of the retainer body. The product-display system may also include a cable-retraction unit, where the cable-retraction unit includes a cable spool and a cable-biasing mechanism. A second end of the retaining cable may be coupled to the cable-retraction unit, and the retaining cable may be spirally wound onto the cable spool in a single plane. Further, the cable-biasing mechanism may provide a biasing force to the cable.

Embodiments also include a product-display system having a retainer for retaining a displayed product. The product-display system may also include a cable-retraction unit having a control unit. The product-display system may also include a retaining cable having a first end coupled to the retainer and a second end coupled to the cable-retraction unit. The retaining cable may be configured to transmit electronic data and power simultaneously, and electronic data and power transmitted by the retaining cable may be sent from the control unit to a displayed product. Further, when the control unit determines that at least one of the electronic data connection and the power connection between the control unit and a displayed product is lost, an alarm may be triggered by the control unit.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
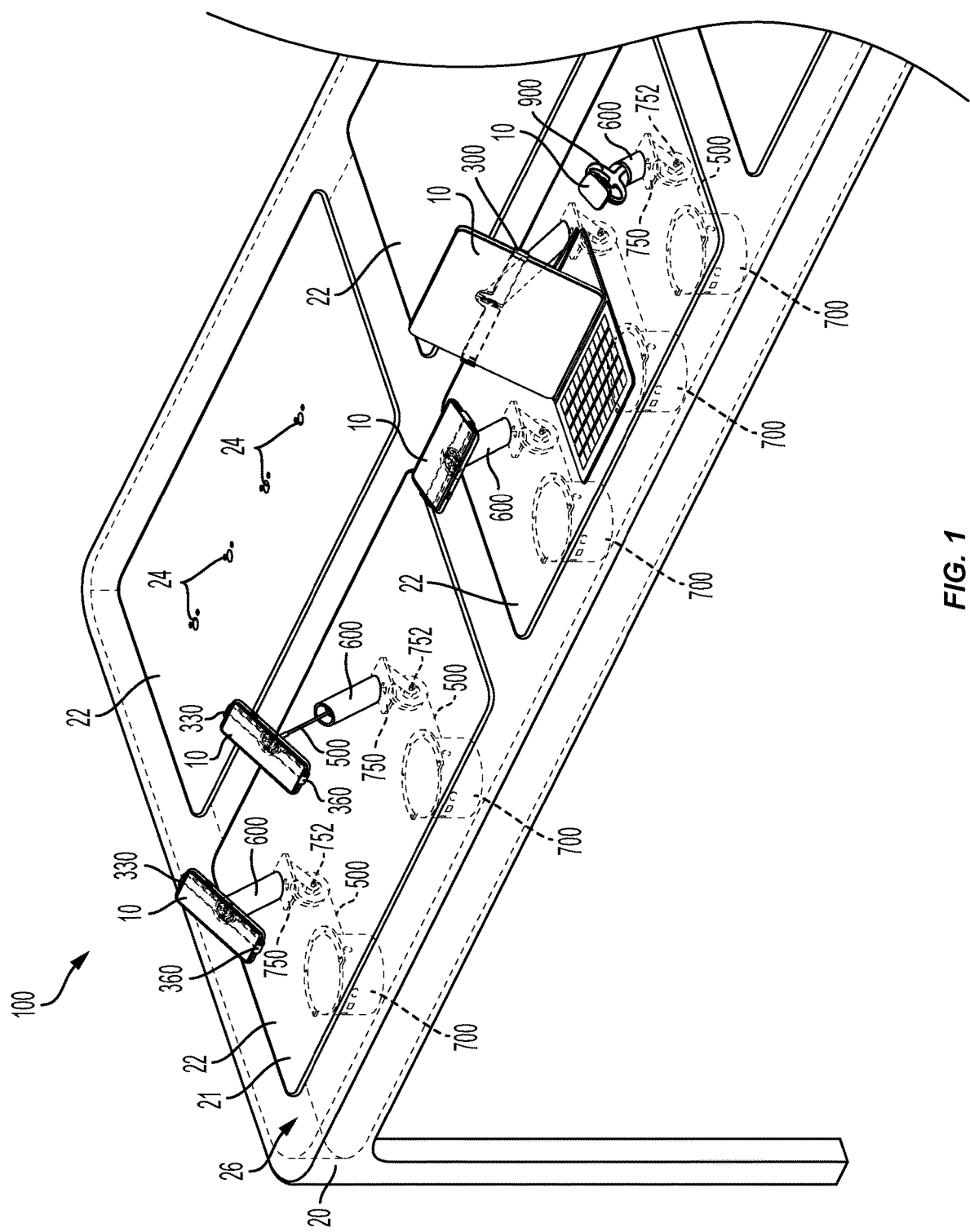
FIG. 1 shows a perspective view of a product-display system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some retailers may wish to display products to potential customers in order to entice customers to purchase products, or to allow customers to interact with and experience the displayed products before making a purchase. For example, some retailers may have a display model product that is representative of products that are available for purchase by a customer, and may make the displayed product accessible to a user, for example, by displaying the product on a retail fixture in a display area. However, some retailers may wish to limit the ability of the customer to remove the display product from the display area (e.g., to prevent theft or other unauthorized use).

The present disclosure relates to product-display systems which may be used, for example, to display products to customers while limiting the customer's ability to remove the displayed product from a display area. The product-display systems may present the displayed products in a consistent, visually-appealing manner. Embodiments described herein may also allow customers to use and manipulate the displayed products without being encumbered by the security features of the product-display system. For example, the product-display system may allow a customer to easily lift, rotate, and manipulate a displayed product in a smooth, fluid, and user-friendly manner, such that the security features do not detract from a customer's experience when viewing, handling, and testing the displayed product.

Embodiments include a product retainer and a display stem that, together, may present a displayed product to a customer. The retainer may, for example, include a bracket that wraps around opposing sides of a displayed product in order to secure the bracket to the displayed product. The retainer may further include a retainer body that may be coupled to the bracket. The retainer may have a smooth, clean appearance without any fasteners of the retainer being visibly or physically obtrusive to the customer. The retainer may also include integrated electronics for connecting to a displayed product without such connections being visibly or physically obtrusive to the customer. The retainer may further have a low, sleek profile such that the retainer itself is not physically observable or obtrusive to the customer. The display stem may include a recess for receiving the retainer body, such that the retainer with product may be placed on and supported by the display stem.

In some embodiments, the retainer may be disassembled by an authorized user such that a retained product may be, for example, easily repaired or replaced. However, the retainer may include a locking mechanism that prevents disengagement by an unauthorized user, for example, while it is being displayed to customers during retail use.

In some embodiments, the product retainer may be removable from the display stem. For example, the product retainer may have a default position where the retainer body is supported within the recess of the display stem and an extended position where the product retainer is moved away from the display stem. In some embodiments, the product retainer may be attached to a retaining cable that may be drawn out of the display stem, thus permitting a customer to remove the product retainer, with a product secured thereon, from the display stem.

In some embodiments, the retaining cable may be configured to simultaneously transmit power and data to a displayed product while also providing a physical connection to the display area (e.g., a retail fixture) that limits a customer's ability to remove the product from the display area. In some embodiments, the retaining cable may be removable from the retainer, and the retainer may include contacts, cables, connectors, or the like for transmitting power/and or data between the retaining cable and the displayed product. In some embodiments, the contacts, cables, connectors, or the like of the retainer are not visible to a customer when a product is retained by the retainer.

The retaining cable may also be attached to a cable-retraction unit that may provide a tension to the retaining cable such that it is retracted through the display stem when a customer releases the product retainer from its extended position (e.g., when a customer moves the product retainer closer to the display stem, for example, when putting it back after examining the product). In some embodiments, after a customer has finished handling the displayed product, tension of the retaining cable causes the product retainer to be returned to its default position on the display stem, which may facilitate an ordered, visually-appealing display area. In some embodiments, the retainer body and display stem recess may have corresponding shapes (e.g., hemispherical) such that the retainer body automatically seats into the recess of the display stem under the tension of the retaining cable. In some embodiments, the retaining cable may be spirally wound in a single layer onto a cable spool of the cable-retraction unit, which may allow the cable to wind and unwind from the cable spool in smooth manner.

Further, in some embodiments, the retainer body and/or the display stem may include magnets that may be used to automatically return the product retainer to its default position and into one or more predefined orientations relative to the display stem. For example, magnetic interaction between magnets of the retainer body and magnets of the display stem may cause the product retainer to rotate within the recess of the display stem, thereby automatically rotating the displayed product into one of the one or more predefined orientations. The predefined orientations may, for example, correspond to portrait and landscape orientations for a display screen of the displayed product. Magnetic interaction between magnets of the retainer body and magnets of the display stem may also help retain the retainer body within the recess of the display stem.

In some embodiments, when the retainer body is disposed within the recess of the display stem, the retainer body may be rotated within the recess of the display stem such that a customer may use the product in multiple orientations while the retainer remains disposed on the display stem. The retainer body may be easily rotated within the recess of the display stem to change the product from one to another of the predefined orientations and to retain the product in the new orientation (e.g., through holding power due to magnetic attraction).

In some embodiments, the product-display system includes a security system that is configured to prevent unauthorized removal of products from the display area. The security system may include an alarm module that may monitor the presence of a product (e.g., via a data and/or power connection), and an alarm may be triggered (e.g., an audible alarm on the alarm module) if the security system detects that a product has been disconnected from the display area. Further, in some embodiments, the products themselves may also monitor the presence of the alarm module (e.g., via a data and/or power connection), and an alarm may be triggered (e.g., an audible alarm on the product) if it is detected that a product has been disconnected from the display area.

These and other embodiments are discussed below with reference to FIGS. 1-19. However, those skilled in the art will readily appreciate that the detailed description given herein with respect to these figures is for explanatory purposes only and should not be construed as limiting.

As shown in FIG. 1, a product-display system 100 may be used to display and secure a product 10. Product 10 may be a retail product such as, for example, a consumer electronic device. Product 10 may be, for example, a cell phone, smartphone, media player, tablet computer, laptop computer, watch, smartwatch, or the like.

In some embodiments, product-display system 100 is integrated into a retail fixture 20. Retail fixture 20 may be, for example, a table, counter, desk, bar, cabinet, display unit, or the like. Retail fixture 20 may be, for example, any of the retail fixtures described in U.S. Non-Provisional application Ser. No. 16/446,223, filed Jun. 19, 2019, titled "Modular Retail Display System," which is incorporated herein in its entirety by reference thereto. Retail fixture 20 may further include a modular display mat 22, which may be, for example, any of the modular display mats described in U.S. application Ser. No. 16/446,223. In some embodiments, multiple product-display systems 100 may be integrated into a retail fixture 20. For example, the multiple product-display systems 100 may all display the same type of product 10 (e.g., all smartphones, all tablet computers, all watches), or may display different types of products 10 (e.g., a smartphone and at least one of a tablet computer or a watch, a tablet computer and at least one of a smartphone and a watch, or a watch and at least one of a smartphone and a tablet computer). In the case of different types of products 10, each product-display system 100 may have different characteristics, such as described in various embodiments herein.

As shown in the example of FIG. 1, product display systems 100 are shown displaying, from left to right, a smartphone (which in some embodiments may be rotatable and removable relative to its display stem 600, shown currently in a portrait orientation), a second smartphone (which in some embodiments also may be rotatable and removable relative to its display stem 600, currently shown in a portrait orientation and removed from its display stem 600), a third smartphone (which in some embodiments also may be rotatable and removable relative to its display stem 600, shown currently in a landscape orientation), a tablet computer (which in some embodiments may not be rotatable or removable from its display stem 600), and a smartwatch (which in some embodiments may or may not be rotatable or removable from its display stem).

Figure 2:
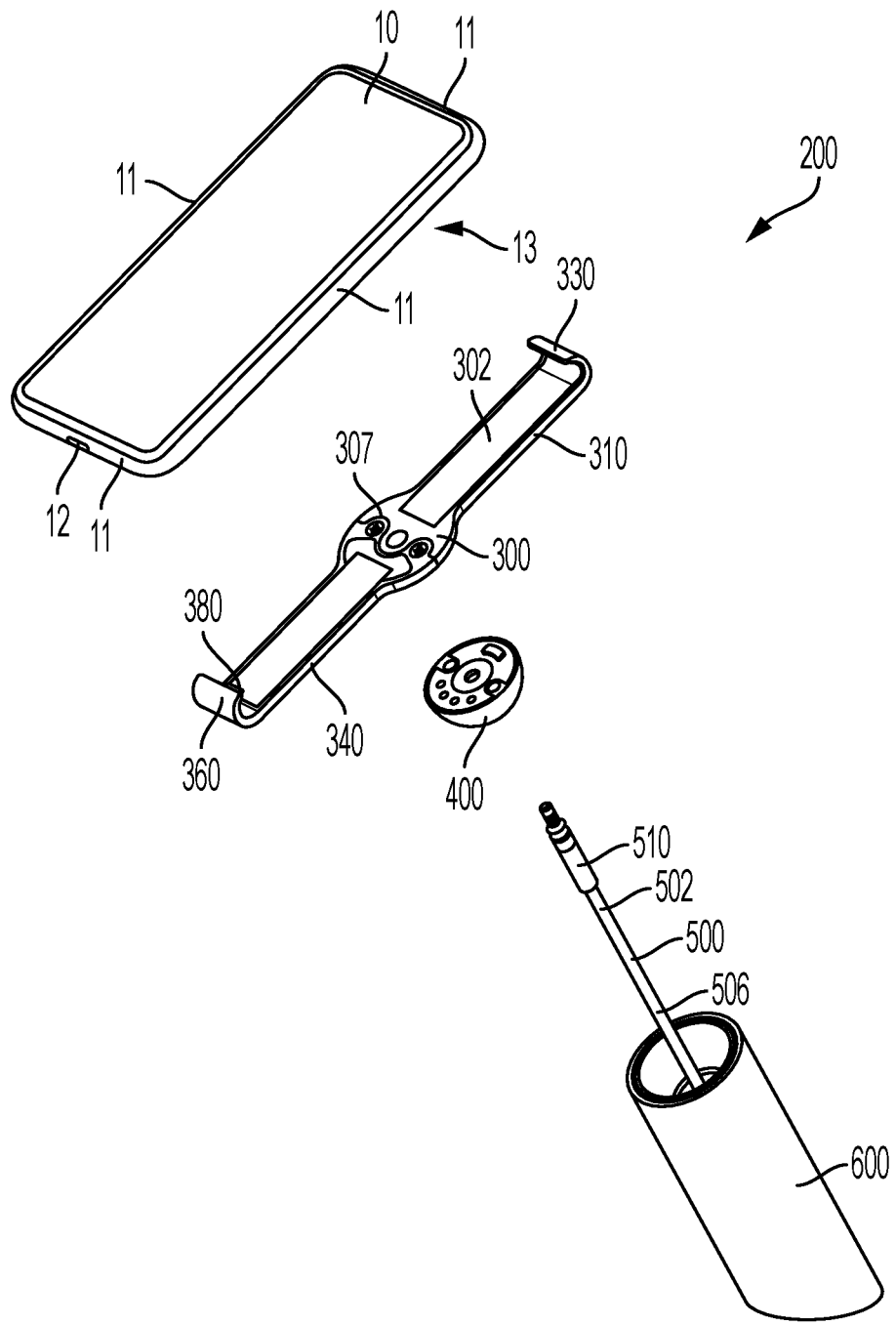
FIG. 2 shows an exploded perspective view of portions of the product-display system of FIG. 1.

With reference to FIGS. 1 and 2, product-display system 100 may include a retainer 200, a retaining cable 500, and a display stem 600. Retainer 200 may include a retainer bracket 300 and a retainer body 400. Retainer bracket 300 may extend around and hold product 10, retainer body 400 may be coupled to retainer bracket 300, and retaining cable 500 may movably couple retainer body to retail fixture 20, thereby securing product 10 to retail fixture 20.

As shown in FIG. 1, display stem 600 may be coupled to and extend from a top surface 21 of retail fixture 20 (e.g., a top surface 21 defined by display mat 22). Retaining cable 500 may extend through display stem 600, through a hole 24 in the top surface 21 of retail fixture 20, and into an interior space 26 of retail fixture 20. A cable-retraction unit 700 may be disposed in interior space 26, hidden from view, and may provide a tension to retaining cable 500, as described in further detail below. In some embodiments, cable-retraction unit 700 is optional, and the choice whether or not to use cable-retraction unit 700 may be influenced by the type of product 10 displayed and its connection to display stem 600 (e.g., whether it is intended to be lifted away from display stem).

Figure 3A:
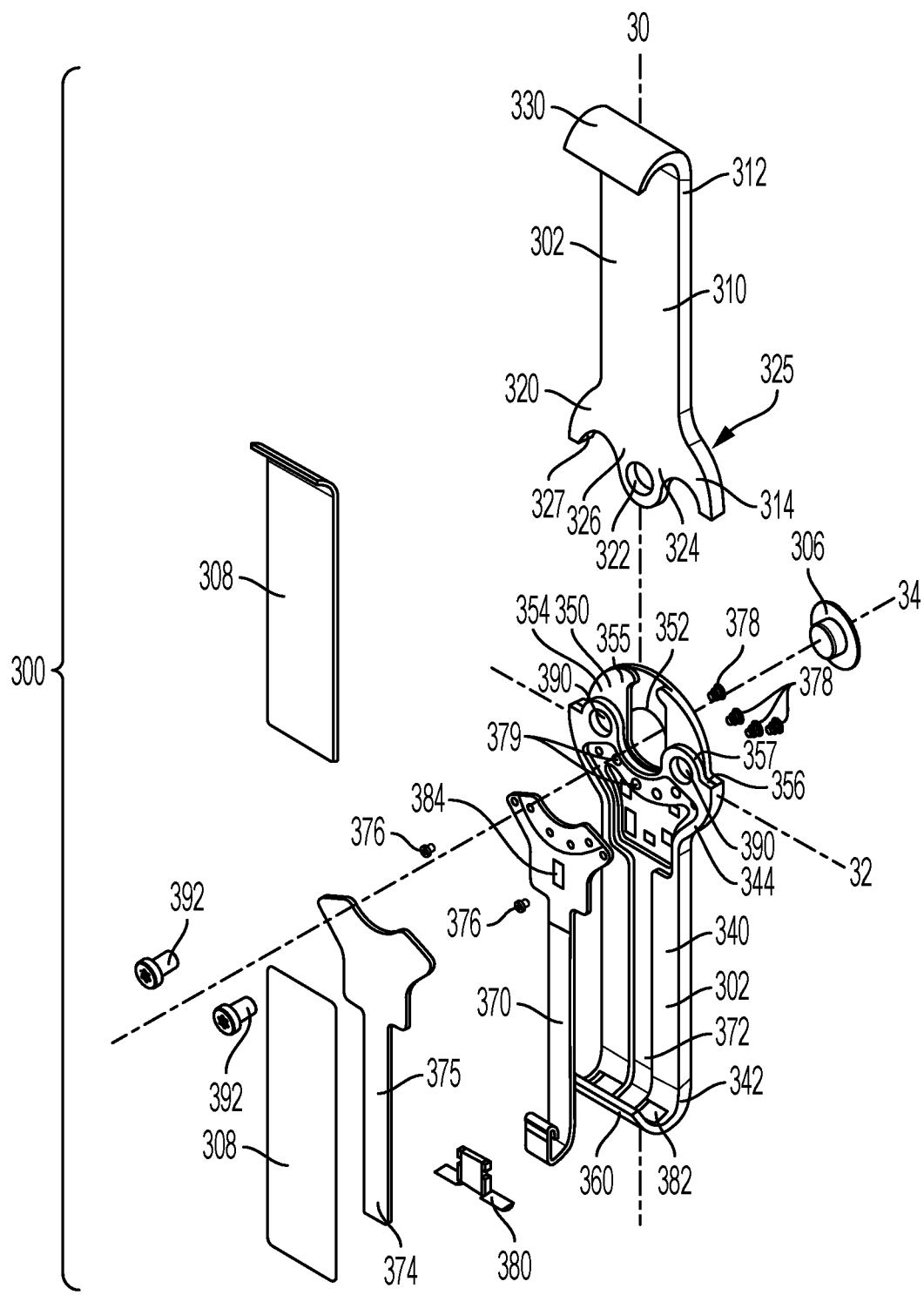
FIG. 3A shows an exploded perspective view of the retainer bracket of FIG. 2.
Figure 3B:
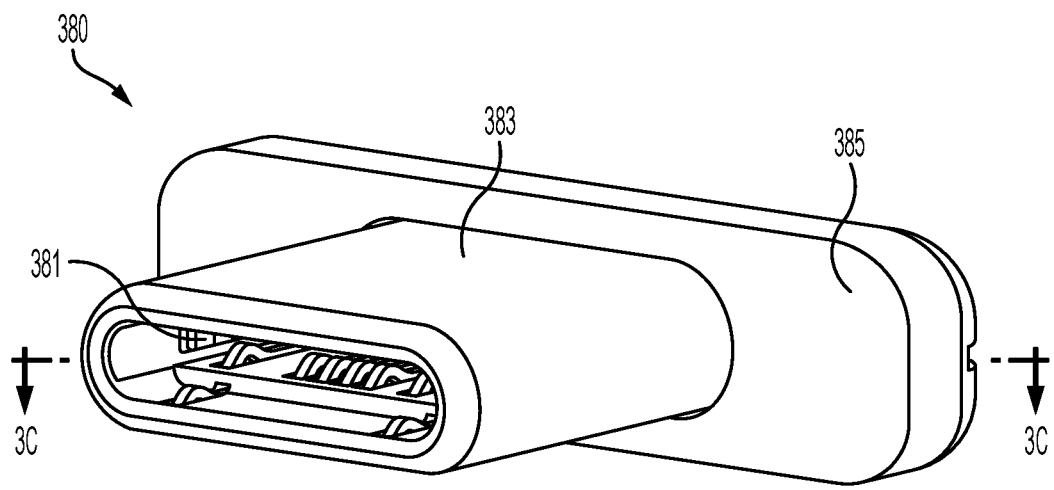
FIG. 3B shows a perspective view of the bracket connector of the retainer bracket of FIG. 2.
Figure 3C:
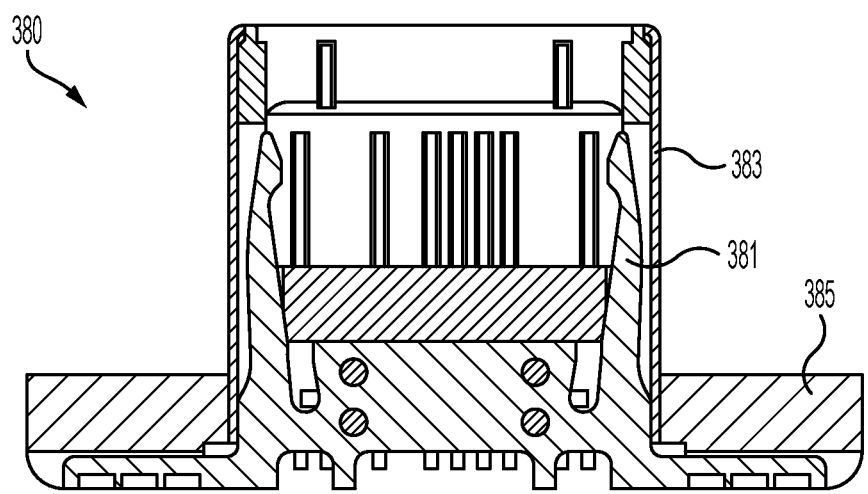
FIG. 3C shows a cross-sectional view taken along line 3C-3C of FIG. 3B.
Figure 4:
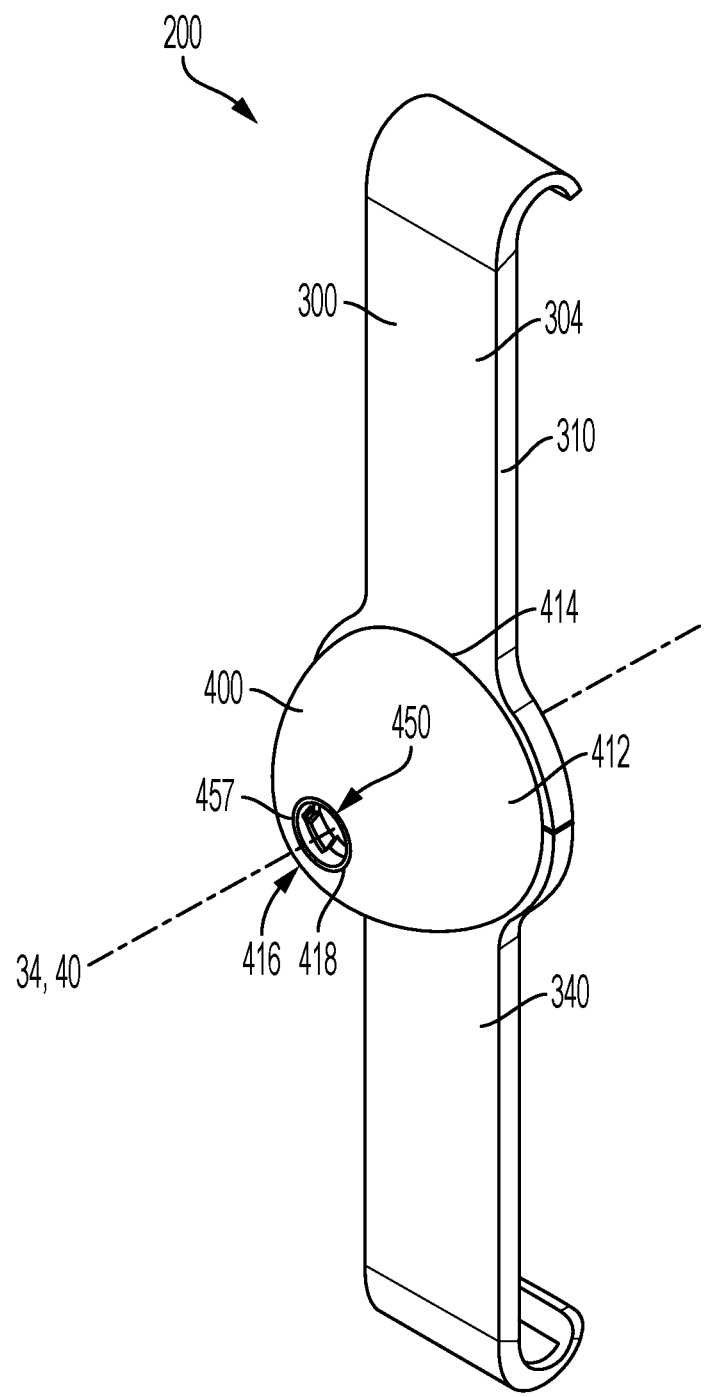
FIG. 4 shows an assembled perspective view of the retainer of FIG. 2.

As shown, for example, in FIGS. 2-4, retainer bracket 300 may include a first arm 310 and a second arm 340 that extend in opposing directions (to extend around opposing sides of product 10, thereby securing product 10 to retainer bracket 300). For example, first arm 310 may include a first end 312 and a second end 314 (see FIG. 3A). Second arm 340 may also include a first end 342 and a second end 344, and second end 344 of second arm 340 may engage with and be coupled to second end 314 of first arm 310. First end 312 of first arm 310 may include a hook 330 that is configured to extend around a side 11 of a product 10. Further, first end 342 of second arm 340 may include a hook 360 that is configured to extend around a side 11 of a product 10 that is disposed opposite the side 11 that is secured by hook 330. In this manner, product 10 may be disposed between and secured by opposing hooks 330, 360 (see, e.g., FIG. 1).

Retainer bracket 300 is shown in the figures to include only two arms, which can be beneficial for securing products in a minimally obtrusive manner. However, in some embodiments, retainer bracket 300 includes more than two arms for securing product 10. For example, retainer bracket 300 may include three, four, five, six, or more arms. In some embodiments, each of the arms includes a hook and each hook may be used to secure a different side 11 of a product 10. For example, in some embodiments, retainer bracket 300 includes four arms, and product 10 has a generally rectangular prismatic shape having at least four sides 11 (see, e.g., product 10 in FIG. 2). The hook of one of each of the four arms may be configured to extend around a different side 11 of product 10, thereby securing product 10 between the hooks. In some embodiments, each of the arms includes a hook and several hooks may be used to secure the same side 11 of a product 10. For example, in some embodiments, retainer bracket 300 includes four arms and product 10 has a generally rectangular prismatic shape having at least four sides 11. The hooks of a first pair of arms may be configured to both extend around the same side 11 of product 10, and the hooks of a second pair of arms may be configured to extend around another side 11 of product 10 that is disposed opposite the side 11 secured by the hooks of the first pair of arms, thereby securing product 10 between the hooks.

In some embodiments, second ends 314, 344 of first and second arms 310, 340 may interlock with one another, which is to say that second ends 314, 344 may overlap, interleave, mesh, interlink, or otherwise fit together and/or engage with one another. By interlocking second ends 314, 344, a direct mechanical connection may be formed between first and second arms 310, 340. Such a mechanical connection may help constrain translational and/or rotational movement of first arm 310 relative to second arm 340, which may simplify the means by which first and second arms 310, 340 are coupled together. For example—and as described in more detail below—a rigid connection between first and second arms 310, 340 may be created using a single bracket arm fastener 306 that is configured to couple first arm 310 to second arm 340.

Accordingly, second end 314 of first arm 310 may include an interlocking portion 320, and second end 344 of second arm 340 may include an interlocking portion 350 that is configured to interlock with interlocking portion 320. Interlocking portion 320 of first arm 310 may include, for example, a bracket fastener hole 322, an overlapping portion 324, and an interfacing portion 326. Further, interlocking portion 350 of second arm 340 may include, for example, a bracket fastener hole 352, an overlapping portion 354, and an interfacing portion 356. Together, overlapping portions 324, 354, interfacing portions 326, 356, and bracket arm fastener 306 may constrain all translational and rotational movement of first arm 310 relative to second arm 340, thereby rigidly coupling first and second arms 310, 340 together. When first bracket arm 310 is coupled together with second bracket arm 340, overlapping portion 324 may overlap with overlapping portion 354, and interfacing portion 326 may interface with interfacing portion 356 (e.g., by an end surface of interfacing portion 326 mating or otherwise coming into contact with an end surface of interfacing portion 356).

As shown in FIG. 3A, a first bracket axis 30 may extend in the direction of extension of first and second arms 310, 340, a fastener axis 34 may extend in the direction of extension of bracket arm fastener 306 (e.g., perpendicular to first bracket axis 30), and a second bracket axis 32 may intersect with both first bracket axis 30 and fastener axis 34 and may extend in a direction that is perpendicular to both first bracket axis 30 and fastener axis 34.

Overlapping portion 324 and overlapping portion 354 may extend in opposing directions along first bracket axis 30. When first and second arms 310, 340 are coupled together (see, e.g., FIG. 2), overlapping portion 324 may overlap with overlapping portion 354. In some embodiments, overlapping portion 324 includes an overlapping surface 325 and overlapping portion 354 includes an overlapping surface 355. When first arm 310 and second arm 340 are coupled together, overlapping surface 325 and overlapping surface 355 may be disposed adjacent to and in contact with one another.

In some embodiments, bracket fastener hole 322 extends through overlapping portion 324 and bracket fastener hole 352 extends through overlapping portion 354. Bracket arm fastener 306 may extend through bracket fastener hole 352 and into and/or through bracket fastener hole 322 and may be configured to couple first arm 310 to second arm 340 (e.g., to lock them together in position relative to each other while bracket arm fastener 306 is disposed within bracket fastener hole 352 and bracket fastener hole 322). Bracket arm fastener 306 may be or may include, for example, a screw, bolt, nut, pin, clamp, and/or other components configured to couple first arm 310 to second arm 340. In some embodiments, one or both of bracket fastener holes 322, 352 include threads that mesh with corresponding threads on bracket arm fastener 306. In some embodiments, bracket arm fastener 306 is a screw that causes overlapping surface 325 to press against overlapping surface 355 when bracket arm fastener 306 is tightened, thereby strengthening a mechanical connection between first arm 310 and second arm 340. First and second arms 310, 340 are shown in the figures to each include only one bracket fastener hole 322, 352, which can simplify construction and assembly or disassembly of retainer bracket 300. The cooperating engagement of interlocking portions 320, 350 can help permit a strong connection by only a single bracket arm fastener 306 (and corresponding bracket arm fastener holes) by inhibiting rotational and translational movement as described elsewhere herein. However, in some embodiments, first and second arms 310, 340 may each include two, three, four, or more bracket fastener holes 322, 352. Further, retainer bracket 300 may include two, three, four, or more bracket arm fasteners 306 that are configured to couple first arm 310 to second arm 340.

Together, bracket arm fastener 306 and overlapping portions 324, 354 may constrain certain translational and rotational movement of first arm 310 relative to second arm 340. For example, translational movement of first arm 310 relative to second arm 340 in the direction of fastener axis 34 may be constrained by bracket arm fastener 306 and/or mechanical interference between overlapping surfaces 325, 355. Further, rotational movement of first arm 310 relative to second arm 340 about second bracket axis 32 may be constrained by bracket arm fastener 306 and/or mechanical interference between overlapping surfaces 325, 355. Further, rotational movement of first arm 310 relative to second arm 340 about first bracket axis 30 may be constrained by bracket arm fastener 306 and/or mechanical interference between overlapping surfaces 325, 355. As described in further detail below, bracket arm fastener 306 and interfacing portions 326, 356 may constrain translational and rotational movement of first arm 310 relative to second arm 340 in additional directions.

When first and second arms 310, 340 are coupled together (see, e.g., FIG. 2), an arm interface 307 may be formed where interfacing portion 326 and interfacing portion 356 meet. As shown in FIG. 2, for example, first and second arm 310, 340 meet at a generally sinusoidal arm interface 307. In some embodiments, for example, as shown, arm interface 307 crosses (e.g., traverses back and forth across) a line perpendicular to the direction of extension of bracket arms 310, 340 (e.g., arm interface crosses or traverses back and forth across second bracket axis 32). Arm interface 307 is not limited to the shape shown in the figures, but may take on a variety of shapes. Arm interface 307 may be straight, curved, or may include both straight and curved portions. For example, arm interface 307 may be S-shaped, wave-shaped, C-shaped, U-shaped, zig-zag-shaped or the like, or may include, for example, S-shaped portions, wave-shaped portions, C-shaped portions, U-shaped portions, zig-zag-shaped portions or other shaped portions.

As mentioned above, in some embodiments, a single bracket arm fastener 306 may be configured to couple first arm 310 to second arm 340. As such, the single bracket arm fastener 306 (which may be, for example, cylindrical) may not inherently constrain rotation of first arm 310 relative to second arm 340 about fastener axis 34. Accordingly, arm interface 307 may create mechanical interference between first and second arms 310, 340 that prevents rotational movement of first arm 310 relative to second arm 340 about fastener axis 34. For example, interfacing portion 326 may include an interfacing surface 327 and interfacing portion 356 may include an interfacing surface 357. Interfacing surfaces 327, 357 may, for example, extend in a direction that is parallel to fastener axis 34 and may include portions disposed on opposing sides of fastener axis 34. Further, when first and second arms 310, 340 are coupled together, interfacing surface 327 and interfacing surface 357 may be disposed adjacent to and in communication with one another. Thus, if first arm 310 is rotated about fastener axis 34 in either direction, interfacing surface 357 may mechanically interfere with interfacing surface 327, thereby causing corresponding rotational movement of second arm 340 about fastener axis 34.

Interfacing surfaces 327, 357 may also help to constrain translational movement of first arm 310 relative to second arm 340. For example, in some embodiments, interfacing surface 327 includes two parallel surface portions disposed on opposing sides of fastener axis 34. Further, in some embodiments, interfacing surface 357 includes two parallel surface portions disposed on opposing sides of fastener axis 34. In this manner, when first and second arms 310, 340 are coupled together and interfacing surfaces 327, 357 are mated together (e.g., in communication with one another), translational movement of first arm 310 relative to second arm 340 in the direction of second bracket axis 32 may cause mechanical interference between interfacing surfaces 327, 357. Thus, translational movement of first arm 310 relative to second arm 340 in the direction of second bracket axis 32 may be constrained by bracket arm fastener 306 and/or mechanical interference between interfacing surfaces 327, 357.

Interfacing surfaces 327, 357 may also help to constrain translational movement of first arm 310 relative to second arm 340 in the direction of first bracket axis 30. For example, in some embodiments, portions of interfacing surface 327 are displaced from portions of interfacing surface 357 in the direction of first bracket axis 30. When first and second arms 310, 340 are coupled together, these portions of interfacing surfaces 327, 357 may be mated together (e.g., in communication with one another). In this manner, if first arm 310 is attempted to be translated toward second arm 340 in the direction of first bracket axis 30, these portions of interfacing surfaces 327, 357 may mechanically interfere with one another. Thus, translational movement of first arm 310 relative to second arm 340 in the direction of first bracket axis 30 may be constrained by bracket arm fastener 306 (e.g., if the arms are pulled apart) and/or mechanical interference between interfacing surfaces 327, 357 (e.g., if the arms are pressed together).

Thus, as described above, translational and rotational movement of first arm 310 relative to second arm 340 may be constrained in all directions using only a single fastener. As described in further detail below, using only a single fastener to couple together first and second arms 310, 340 may help allow bracket arm fastener 306 to be hidden from view, which may facilitate a clean, smooth visual appearance of retainer.

In some embodiments first arm 310 and second arm 340 are formed integrally with each other (e.g., without the interfacing and overlapping surfaces, and related structure, described above).

With reference to FIGS. 2-4, in some embodiments, retainer bracket 300 may include an inner surface 302 and an outer surface 304. In some embodiments, when product 10 is secured by retainer 200, an outer surface 13 of product 10 is disposed against (e.g., flush with) inner surface 302 of retainer bracket 300 (allowing for intervening adhesive or cushioning elements, such as, for example, adhesive strips 308 discussed below).

In some embodiments, adhesive may be used to adhere product 10 to retainer bracket 300. For example, adhesive 308 may be applied as one or more adhesive strips 308 disposed on inner surface 302 of retainer bracket 300 and may be configured to adhere outer surface 13 of product 10 to inner surface 302 of retainer bracket 300.

In some embodiments, adhesive 308 is used in conjunction with other elements of retainer bracket 300 (e.g., hooks 330, 360) to secure product 10 to retainer bracket 300. For example, adhesive 308 may be configured to supplement the retaining force provided by hooks 330, 360. In some embodiments, adhesive 308 is the primary means for securing product 10 to retainer 200, which is to say that adhesive 308 alone has sufficient adhesive strength to retain product 10 to retainer 200 during display and/or use in a retail environment. In some embodiments, product 10 may be un-adhered from retainer 200 using a special tool and/or an adhesive remover. In some embodiments, if an unauthorized individual un-adheres product 10 from retainer 200, an alarm is triggered (as discussed in more detail below).

Adhesive 308 (which may be applied as adhesive strips, as shown) may include an adhesive such as, for example, glue, cement, paste, or other substance capable of adhering product 10 to retainer bracket 300. In some embodiments, adhesive 308 may be adhesive strips having adhesive on both sides of the strip (e.g., double-sided tape or the like).

In some embodiments, adhesive 308 may be configured to reduce the amount of movement of product 10 relative to retainer bracket 300 and/or to reduce vibrations between product 10 and retainer bracket 300. In some embodiments, retainer bracket 300 is made of a hard material (e.g., metal) and adhesive 308 is configured to prevent retainer bracket 300 from scratching, scraping, or otherwise damaging product 10 by providing a buffer between retainer bracket 300 and product 10. In some embodiments, adhesive 308 may be strips having adhesive only on one side of the strip (e.g., the side facing inner surface 302 of retainer bracket 300). In some embodiments, adhesive strips 308 include soft material, padding or the like on one side of the strip (e.g., the side facing the product) to provide a buffer between retainer bracket 300 and product 10.

In some embodiments, retainer bracket 300 includes an integrated cable and connector for transmitting power and/or data to product 10. In some embodiments, the integrated cable and connector are not visible when product 10 is disposed in retainer bracket 300, which may facilitate a clean, visual appearance of retainer 200.

In some embodiments, retainer bracket 300 includes one or more bracket contacts 378, a bracket cable 370, and a bracket connector 380 for transmitting power and/or data to product 10. In some embodiments, second arm 340 includes bracket contact holes 379 that extend through second arm 340 from inner surface 302 to outer surface 304. Bracket contacts 378 may be disposed in bracket contact holes 379 and may be used to transmit power and/or data between, for example, retainer body contacts 438 (described in more detail below) and bracket cable 370. Bracket contacts 378 and/or bracket contact holes 379 may include an electrically insulating material to prevent electrical communication between bracket contacts 378 and second arm 340.

In some embodiments, bracket connector 380 is disposed on hook 360 of second arm 340 and is coupled to inner surface 302 of second arm 340. In some embodiments, bracket connector 380 is removably coupled to second arm 340 such that it may be, for example, removed and replaced. In some embodiments, bracket connector 380 is integrally formed with second arm 340. Bracket connector 380 may be configured to be received by a corresponding connector port 12 disposed on a side 11 of product 10 when product 10 is disposed in retainer bracket 300. Bracket connector 380 may be used to transmit power and/or data between, for example, between bracket cable 370 and product 10.

In some embodiments, bracket connector 380 may be a USB—C-type connector, as shown in FIGS. 3B and 3C. Bracket connector 380 may have an internal latch mechanism 381 integrated with a shell 383 (e.g., via press fit) and frame 385 (e.g., via welding) of bracket connector 380. Such a configuration can provide improved strength and a ground path for shielding. During installation of a product 10 to be displayed, product 10 may be plugged into bracket connector 380 of second arm 340, and internal latch mechanism 381 may help to hold product 10 in position until first arm 310 is installed and secured. Shell 383 and frame 385 of bracket connector 380 may be welded together (e.g., laser welded about the perimeter of their connection). Frame 385 of bracket connector 380 may be wider than shell 383 so as to provide stability and increased bonding surface area, for example for bonding bracket connector 380 to retainer bracket 300 (e.g., at bracket connector recess 382 of second arm 340). Also for added stability, frame 385 may be wider than it is tall (width taken horizontally in FIG. 3C and height taken vertically).

Bracket cable 370 may be coupled to second arm 340, may extend between at least a portion of first end 342 and second end 344, and may be disposed adjacent to inner surface 302 of second arm 340. In some embodiments, bracket cable 370 is removably coupled to second arm 340 using bracket cable fasteners 376 such that it may be, for example, removed and replaced. In some embodiments, bracket cable 370 is integrally formed with second arm 340. In some embodiments, bracket cable 370 is electrically coupled to bracket contacts 378 and bracket connector 380 and may be used to transmit power and/or data between bracket contacts 378 and bracket connector 380. In some embodiments, bracket cable 370 is a substantially flat cable such as, for example, a flexible flat cable ("FFC"), a ribbon cable, or the like.

In some embodiments, retainer bracket 300 includes a processing device 384. As described in further detail below, processing device 384 may be configured to, for example, receive and translate electronic data from one communication protocol to another and/or to monitor the voltage (or other power characteristics) of power provided to product 10. In some embodiments, retainer bracket 300 includes processing device 384, which may be coupled to one of first and second arms 310, 340 (e.g., coupled to bracket cable 370 of second arm 340). In some embodiments, processing device 384 is integrally formed with bracket cable 370. Processing device 384 may be, for example, a computer, microcontroller, or the like. Processing device 384 may include, for example, a processor, memory, and communication infrastructure for sending and receiving electronic data.

In some embodiments, second arm 340 includes a bracket cable recess 372 disposed on inner surface 302. Bracket cable recess 372 may be, for example, a groove, channel, depression, cavity, or the like that extends between at least a portion of first end 342 and second end 344 of second arm 340. In some embodiments, bracket cable recess 372 extends between first end 342 and second end 344 at least to the position of bracket contact holes 379 and bracket connector recess 382. Bracket cable 370 may be disposed within bracket cable recess 372. In some embodiments, retainer bracket 300 includes a bracket cable cover 374 that covers bracket cable 370 when it is disposed in bracket cable recess 372. In some embodiments, an outer surface 375 of bracket cable cover 374 is flush with inner surface 302 when bracket cable 370 is disposed in bracket cable recess 372 and bracket cable cover 374 is disposed to cover bracket cable recess 372. Bracket cable recess 372 may be configured, for example, to allow bracket cable 370 to be disposed between second arm 340 and product 10 while the outer surface 13 of product 10 is flush with inner surface 302 of retainer bracket 300. In this manner, when product 10 is secured in retainer bracket 300, bracket cable 370 may be completely concealed and not accessible and to a user.

In some embodiments, second arm 340 includes a bracket connector recess 382 disposed on inner surface 302. Bracket connector recess 382 may be, for example, a groove, channel, depression, cavity, or the like. In some embodiments, bracket connector recess 382 is disposed on inner surface 302 of hook 360. Bracket connector recess 382 may be configured, for example, to allow bracket connector 380 to be received by connector port 12 of product 10 while product 10 is retained at least in part by second arm 340 (e.g., when the side 11 of product 10 is flush with inner surface 302 of hook 360). In this manner, when product 10 is secured in retainer bracket 300, bracket connector 380 may be completely concealed and not accessible to a user.

Figure 5A:
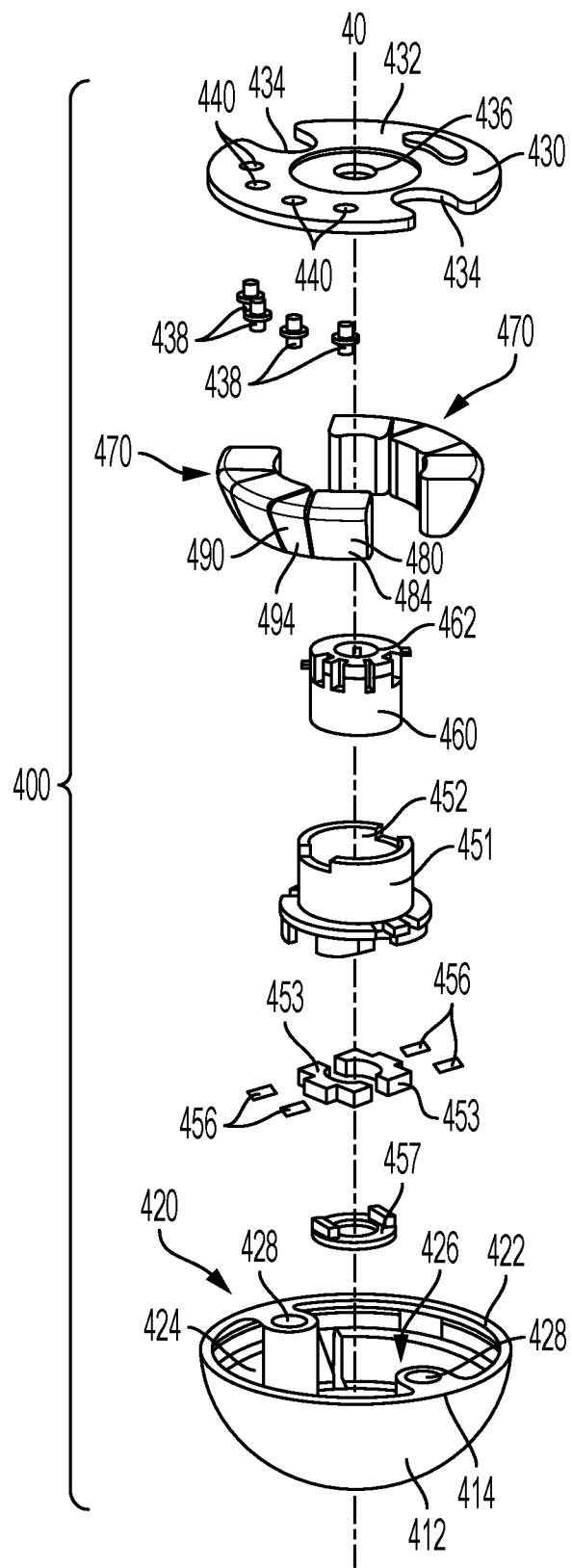
FIG. 5A shows an exploded view of the retainer body of FIG. 2.
Figure 5B:
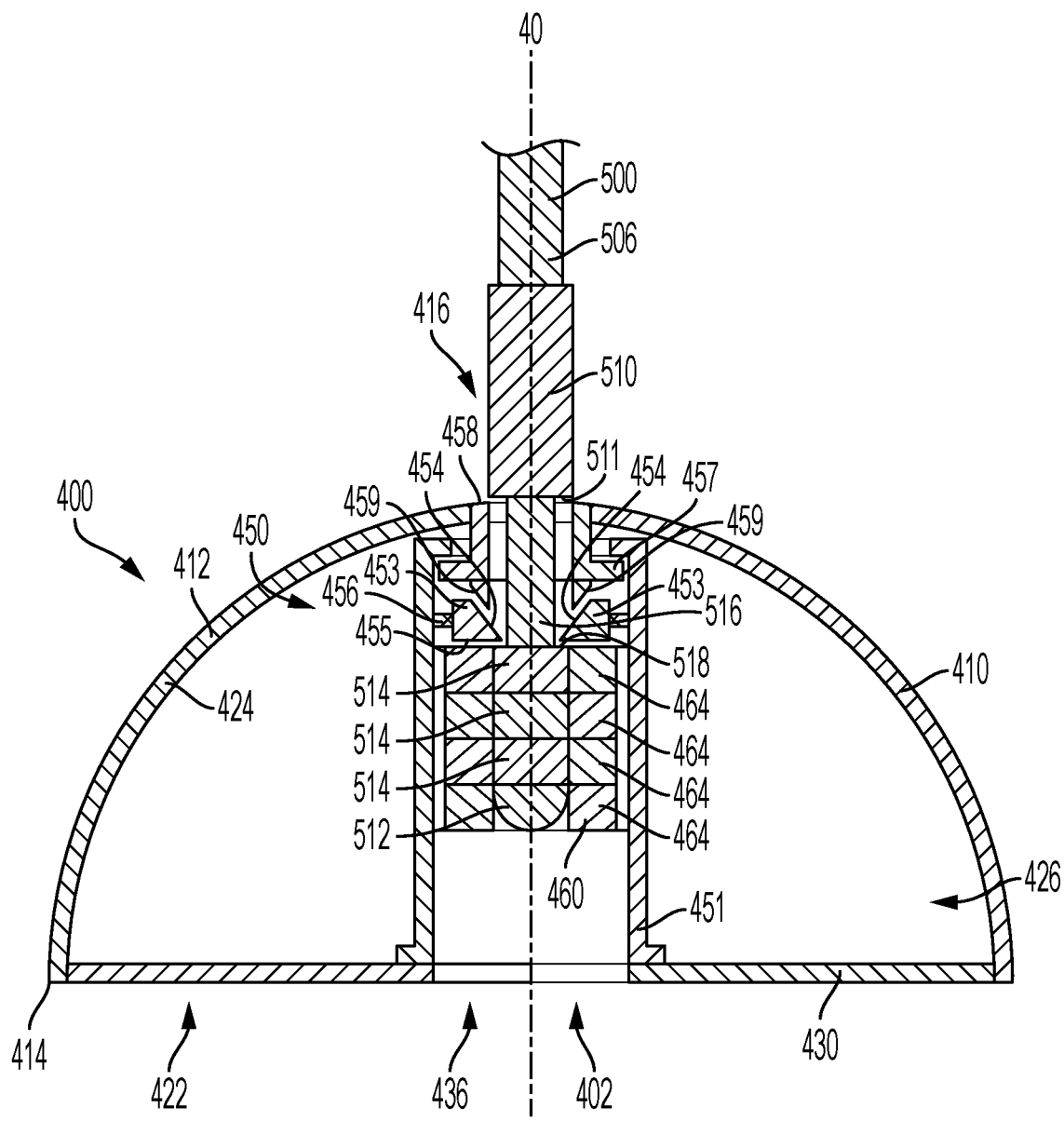
FIG. 5B shows a cross-sectional view of portions of the retainer body of FIG. 2, assembled with the retaining cable of FIG. 2.

With reference to FIGS. 4-5B, for example, retainer 200 may include a retainer body 400 that may be coupled to retainer bracket 300. In some embodiments, retainer body 400 includes a shell 410 and a shell cover 430 that together define the general shape of retainer body 400.

Shell 410 may include an outer surface 412 that is defined by an edge 414. Shell 410 may include a first opening 416 that is defined by a first perimeter 418 and that extends from outer surface 412 to an inner surface 424 of shell 410. Inner surface 424 may define an interior space 426. Shell 410 may include a second opening 420 defined by a second perimeter 422, and interior space 426 may be accessible through first opening 416 and/or second opening 420.

In some embodiments, edge 414 defines a continuous shape, which is to say that edge 414 defines a shape that follows a continuous path without any discontinuities. In some embodiments, edge 414 defines a continuous, smooth shape. In some embodiments, edge 414 defines a continuous shape that exists in a two-dimensional plane. In some embodiments, edge 414 defines a circular shape (e.g., as shown). In some embodiments, when retainer body 400 is coupled to retainer bracket 300, edge 414 is in continuous contact, or apparent contact, with outer surface 304 of retainer bracket 300, which is to say that there are no visible gaps between edge 414 and outer surface 304 (see, e.g., FIG. 4).

In some embodiments, outer surface 412 is a smooth surface that extends continuously from edge 414 to first perimeter 418. In other words, the outer surface of retainer body 400 (e.g., outer surface 412) between its upper edge (e.g., edge 414) and its lower extent (e.g., perimeter 418) forms an unbroken surface, a continuous surface, that is, a surface uninterrupted by discontinuities or surface elements (e.g., openings, edges, corners, seams, windows, or electrical elements such as contacts or sensors). In some embodiments, outer surface 412 is a convex surface. In some embodiments, outer surface 412 is a concave surface. In some embodiments, outer surface 412 includes both convex and concave portions. In some embodiments, outer surface 412 is continuously curved from edge 414 to first perimeter 418. In some embodiments, outer surface 412 is hemispherical in shape (e.g., as shown). In some embodiments, outer surface 412 is axisymmetric with respect to a retainer body axis 40. In some embodiments, when retainer body 400 is coupled to retainer bracket 300, retainer body axis 40 is collinear with fastener axis 34 (see, e.g., FIG. 4).

In some embodiments, edge 414 defines a circular shape and first perimeter 418 also defines a circular shape. In some embodiments, first perimeter 418 has a diameter that is less than the diameter of edge 414. In some embodiments, edge 414 and first perimeter 418 are disposed in parallel planes that are spatially displaced along retainer body axis 40. In some embodiments, the center points of edge 414 and first perimeter 418 are aligned with retainer body axis 40, such center points being centers of area of the areas bounded by edge 414 and first perimeter 418, respectively.

As mentioned above, in some embodiments, retainer body 400 includes a shell cover 430. Shell cover 430 may be configured to cover second opening 420. In some embodiments, shell cover 430 has a shape that generally corresponds to the shape defined by second perimeter 422. Shell cover 430 may include a bracket arm fastener hole 436. In some embodiments, bracket arm fastener hole 436 may have a circular shape and may be disposed such that its center point is aligned with fastener axis 34. In some embodiments bracket arm fastener hole 436 is aligned with first opening 416 and retainer body 400 includes a void 402 that extends from bracket arm fastener hole 436 to first opening 416. In this manner, bracket arm fastener may be accessed through first opening 416 when retainer body is coupled to retainer body 400. For example, a user may insert a fastening tool (e.g., a screwdriver) into first opening 416, through void 402, and through bracket arm fastener hole 436 in order fasten or unfasten bracket arm fastener 306.

With reference to FIGS. 5A and 5B, for example, retainer body 400 may include a cable port 460 disposed in interior space 426 that may be configured to receive a cable plug 510 of retaining cable 500. Cable port 460 may be disposed adjacent to first opening 416 and may be configured to receive cable plug 510 when it is inserted into first opening 416 in an axial direction relative to retainer body axis 40. In some embodiments, cable port 460 includes a thru hole 462 that extends completely though cable port 460 in the direction of retainer body axis 40, for example, such that when cable plug 510 is not disposed in cable port 460, bracket arm fastener 306 may be accessible via first opening 416 and through cable port 460.

Cable plug 510 may be, for example, disposed at a first end 502 of retaining cable 500 (see, e.g., FIG. 2). In some embodiments, retaining cable 500 is configured to transmit power and electronic data simultaneously. Retaining cable 500 may include multiple conductors (e.g., wires) that are disposed within a single cable jacket 506. In FIG. 5B—which is a schematic, cross-sectional view—the internal conductors (e.g., internal wires) of retaining cable 500 are not shown. The multiple conductors may be electrically isolated from one another such that some of the conductors may transmit power while other conductors transmit electronic data, for example. Accordingly, cable plug 510 may include electrically isolated contacts corresponding to each of the conductors of retaining cable 500 and cable port 460 may include electrically isolated contacts corresponding to each of the contacts of cable plug 510.

For example, cable plug 510 may include a tip contact 512 and one or more ring contacts 514. Each of tip contact 512 and ring contacts 514 may be in electrical communication with one of the conductors of retaining cable 500. Cable port 460 may include a port contact 464 corresponding to each of tip contact 512 and ring contacts 514. As such, both power and data may be transmitted simultaneously through retaining cable 500, though cable plug 510 and then to cable port 460, via different contacts of tip contact 512 and ring contacts 514.

A second end 504 of retaining cable 500 may be coupled to cable-retraction unit 700 (described in further detail below) and, thus, secured to a retail fixture 20. Accordingly, retaining cable 500 may prevent retainer 200 from being moved away from retail fixture 20 any further than the extendable length of retaining cable 500, for example. Thus, retaining cable may provide an electrical connection (e.g., power and/or data) to product 10 while simultaneously providing a physical connection to product 10 that secures product 10 to retail fixture 20. In some embodiments, retaining cable 500 may include strengthening features, for example, to make it difficult to break or cut retaining cable 500. For example, cable jacket 506 may include a flexible metal mesh, metal wrap, or the like to strengthen retaining cable 500.

As mentioned above, in some embodiments, retaining cable 500 may be coupled to retainer body 400. In some embodiments, retainer body 400 includes a cable release mechanism 450 that is configured to removably couple retaining cable 500 to retainer body 400. Cable release mechanism 450 may include a cable release housing 451, cable retainers 453, biasing members 456, and a collar 457.

Cable release housing 451 may be disposed within interior space 426, may be generally cylindrical in shape, and may include a thru hole 452 that extends completely though cable release housing 451 in the direction of retainer body axis 40. In some embodiments, cable release housing 451 is coupled to body shell 410. In some embodiments, cable release housing 451 is integrally-formed with body shell 410.

Cable port 460 may be disposed in thru hole 452 and may be coupled to cable release housing 451. Cable retainers 453 may also be disposed in thru hole 452 of cable release housing 451 and may be configured to retain cable plug 510. As shown in FIGS. 5A and 5B, for example, cable retainers 453 may be generally C-shaped and may include an angled surface 454 and a retaining surface 455. One or more biasing members 456 may be disposed between cable retainers 453 and cable release housing 451 and may be configured to bias cable retainers 453 to move in a radially inward direction relative to retainer body axis 40. Biasing members 456 may be, for example, springs, linear springs, or the like.

As cable plug 510 is inserted into first opening 416, tip contact 512 and/or ring contacts 514 of cable plug 510, for example, may come into contact with angled surfaces 454 of cable retainers 453. Cable plug 510 may include a retaining portion 516 that may, for example, have a smaller diameter than tip contacts 512 and ring contacts 514 of cable plug 510 and may define a retaining surface 518. As cable plug 510 is inserted further into first opening 416, cable plug 510 causes cable retainers 453 to move in a radially outward direction relative to retainer body axis 40. As cable plug 510 is inserted further into first opening 416, tip contact 512 and/or ring contacts 514 move past cable retainers 453, thereby permitting biasing members 456 to move cable retainers 453 back in an radially inward direction due to the reduced diameter of retaining portion 516. Retaining surface 518 may be substantially parallel to retaining surface 455. Thus, if cable plug 510 is moved in the opposite direction (i.e., toward removal from first opening 416), retaining surface 455 will mechanically interfere with retaining surface 518, thus preventing retaining cable plug 510 from being removed from cable release mechanism 450.

In some embodiments, collar 457 is annular in shape and is disposed in first opening 416. Cable plug 510 may be inserted through collar 457 into cable port 460. In some embodiments, collar 457 includes and outer surface 458 and outer surface 458 is flush with outer surface 412 when collar 457 is in an undepressed state.

When cable plug 510 is retained by cable release mechanism 450, collar 457 may be depressed (e.g., moved into interior space 426 in an axial direction relative to retainer body axis 40) in order to release cable plug 510 from cable release mechanism 450. For example, collar 457 may include angled surfaces 459 that correspond to angled surfaces 454 of cable retainers 453. When collar 457 is depressed by applying an axial force (e.g., in the direction of retainer body axis 40) to outer surface 458 of collar 457, for example, angle surfaces 459 may come into contact with angled surfaces 454. As collar 457 is depressed further, angle surfaces 459 may press against angled surface 454, thereby causing cable retainers 453 to move in a radially outward direction relative to retainer body axis 40, thus allowing cable plug 510 to be removed from first opening 416 without mechanical interference between retaining surface 455 and retaining surface 518.

In some embodiments, in order to release retaining cable 500 from retainer body 400, collar 457 must be uniformly depressed, which is to say that an axial force must be applied uniformly across outer surface 459. For example, if a force is applied to only a portion of outer surface 459 (e.g., on one side of collar 457), collar 457 may for example, twist within first opening 416 and may mechanically interfere with cable release housing 451 and/or retaining cable 500 rather than siding axially about retainer body axis 40, which may prevent angle surfaces 454 from engaging angled surfaces 459, thereby preventing cable retainers 453 from moving in an radially outward direction, and thereby preventing cable plug 510 from being released from cable release mechanism 450.

Further, outer surface 458 may have a small surface area, which may make it difficult to apply a uniform force to outer surface 458 without using a purpose-built tool that is configured to apply a uniform force to the small surface area. In some embodiments, for example, outer surface 458 may have a surface area of less than approximate 150 square millimeters. In some embodiments, for example, outer surface 458 may have a surface area of less than approximately 100 square millimeters. In some embodiments, for example, outer surface 458 may have a surface area of less than approximately 60 square millimeters.

In some embodiments, cable plug 510 includes an outer retaining surface 511 that mechanically interferes with outer surface 458 when cable plug 510 is inserted into first opening 416, thereby preventing cable plug 510 from being inserted further into first opening 416. Thus, cable plug 510 may be held in place in first opening 416 by mechanical interference between outer retaining surface 511 and outer surface 458, and retaining surface 455 and retaining surface 518, respectively.

In some embodiments, cable plug 510 may rotate freely about retainer body axis 40. Thus, if retainer 200 is rotated, for example, by a customer testing the product, cable plug 510 may rotate inside of cable port 460 thereby reducing or eliminating any twisting tension in retaining cable 500. Reducing or eliminating twisting tension may, for example, prevent retaining cable 500 from coiling upon itself and may reduce wear on retaining cable 500 during use. In some embodiments, cable plug 510 and cable port 460 may together form an electrical rotary joint, slip ring joint, rotary electrical interface, or the like that may permit 360 degree rotation of cable plug 510 relative to cable port 460 while maintaining electrical communication between cable plug 510 and cable port 460.

With reference to FIGS. 2-5A, retainer body 400 may be coupled to outer surface 304 of retainer bracket 300. Shell 410 may include retainer body fastener holes 428 that are configured to receive retainer body fasteners 392. In some embodiments, second arm 340 includes retainer body fastener holes 390, and retainer body fasteners 392 may extend through retainer body fastener holes 390 and into retainer body fastener holes 428, thereby coupling retainer body 400 to second arm 340 (see, e.g., FIG. 4). In some embodiments, shell cover 430 includes cutouts 434 such that retainer body fasteners 392 may extend into retainer body fastener holes 428 without interference from shell cover 430. Similarly, in some embodiments, shell cover 430 includes holes such that retainer body fasteners 392 may extend through shell cover 430 and into retainer body fastener holes 428.

In some embodiments, shell cover 430 includes body contact holes 440 that extend through shell cover 430. Body contacts 438 may be disposed in body contact holes 440 and may be used to transmit power and/or data between, for example, retainer bracket contacts 378 (described above) and cable port 460. Body contacts 438 may be electrically coupled, either directly or indirectly, to port contacts 464. For example, in some embodiments, each of body contacts 438 corresponds to one port contact 464 and is electrically coupled, either directly or indirectly, to the corresponding port contact 464. Body contacts 438 and/or body contact holes 440 may include an electrically insulating material to prevent electrical communication between body contacts 438 and shell cover 430. When retainer body 400 is coupled to retainer bracket 300, bracket contacts 378 may be aligned with and in electrical communication with body contacts 438.

In some embodiments, in order to install a product 10 in retainer 200, components of retainer 200 must be assembled in a particular order. For example, retainer body 400 may first be coupled to second arm 340 using retainer body fasteners 392. Then, a side 11 of product 10 may be positioned in hook 360, and bracket connector 380 may be inserted into connector port 12 of product 10. Next, first arm 310 may be positioned such that interlocking portion 320 of first arm 310 interlocks with interlocking portion 350 of second arm 340. When interlocking portions 320, 350 are interlocked, hook 330 may secure a side 11 of product 10 that is disposed opposite of the edge secured by hook 360. Then, by extending a fastener tool through first opening 416, for example, bracket arm fastener 306 may be used to fasten first and second arms 310, 340 together, thereby creating a rigid connection between first arm 310, second arm 340, and retainer body 400. Accordingly, product 10 may be rigidly secured between hooks 330, 360 and first and second arms 310, 340. Finally, cable plug 510 may be inserted into first opening 416 and cable release mechanism 450 may secure cable plug 510.

After cable plug 510 is inserted into first opening 416 and secured by cable release mechanism 450, bracket arm fastener 306 may be completely obscured by retainer 200 and/or product 10. Thus, bracket arm fastener 306 may not be accessible without removing cable plug 510 from first opening 416. Since removing bracket arm fastener 306 is necessary to remove product 10 from retainer 200, making bracket arm fastener 306 inaccessible may improve the security-related effectiveness of product-display system 100. As mentioned above, outer surface 412 may be continuous and smooth, and edge 414 may be continuous and in continuous communication with outer surface 304. Accordingly, retainer 200 may have a smooth, continuous outer surface that includes no gaps, no visible fasteners, and therefore no obvious means of disassembly. Again, such a configuration may improve the security-related effectiveness of product-display system 100.

In some embodiments, in order to remove product 10 from retainer 200, components of retainer 200 must be disassembled in a particular order. For example, collar 457 may be uniformly depressed (e.g., using a purpose-built tool) in order to release cable plug 510 from cable release mechanism 450. Then, cable plug 510 may be removed from first opening 416. Then, by extending a fastener tool through first opening 416, for example, bracket arm fastener 306 may be unfastened, thereby decoupling first arm 310 from second arm 340. Then, first arm 310 may be moved away from product 10 and second arm 340, thus releasing the side 11 of product 10 secured by hook 330. Finally, product 10 may then be moved away from second arm 340, thus releasing the side 11 of product 10 secured by hook 360 and removing bracket connector 380 from connector port 12.

As described above, connector port 12 of product 10 and bracket connector 380 of retainer bracket 300 may be completely obscured and not accessible to a user when product 10 is secured in product retainer 200. However, in order to service, run diagnostics, upload data to or download data from product 10, for example, an employee may desire to utilize a connection to connector port 12. To access connection port 12 directly, product 10 may be removed from product retainer 200 (e.g., using the steps described above).

In some embodiments, such removal of product 10 from product retainer 200 may be avoided. For example, product-display system 100 may permit product 10 to communicate with an external device (e.g., a service computer) via a service cable while retained in product retainer 200 by utilizing the electrical connections of product retainer 200 described above. For example, the service cable may include a first end having a cable plug that is similar to (or the same as) cable plug 510. The cable plug of the service cable may be configured to be received by cable port 460 which, as described above, may be in electrical communication with bracket connector 380. Thus, data and/or power transmitted via the cable plug of the service cable may be received by bracket connector 380 and product 10. The service cable may also have a second end that may include a connector (e.g., a standard connector such as a Universal Serial Bus ("USB") connector or the like) that may be connected to a computer, power supply or the like in order to communicate with a product 10 (e.g., transmit or receive data) or to transmit power to a product 10 via the cable plug of the service cable. Accordingly, if a product 10 is in need of servicing, for example, an employee may detach retaining cable 500 from cable port 460, attach the service cable to cable port 460, and use the service cable to service product 10 while product 10 remains secured in product retainer 200.

Figure 6:
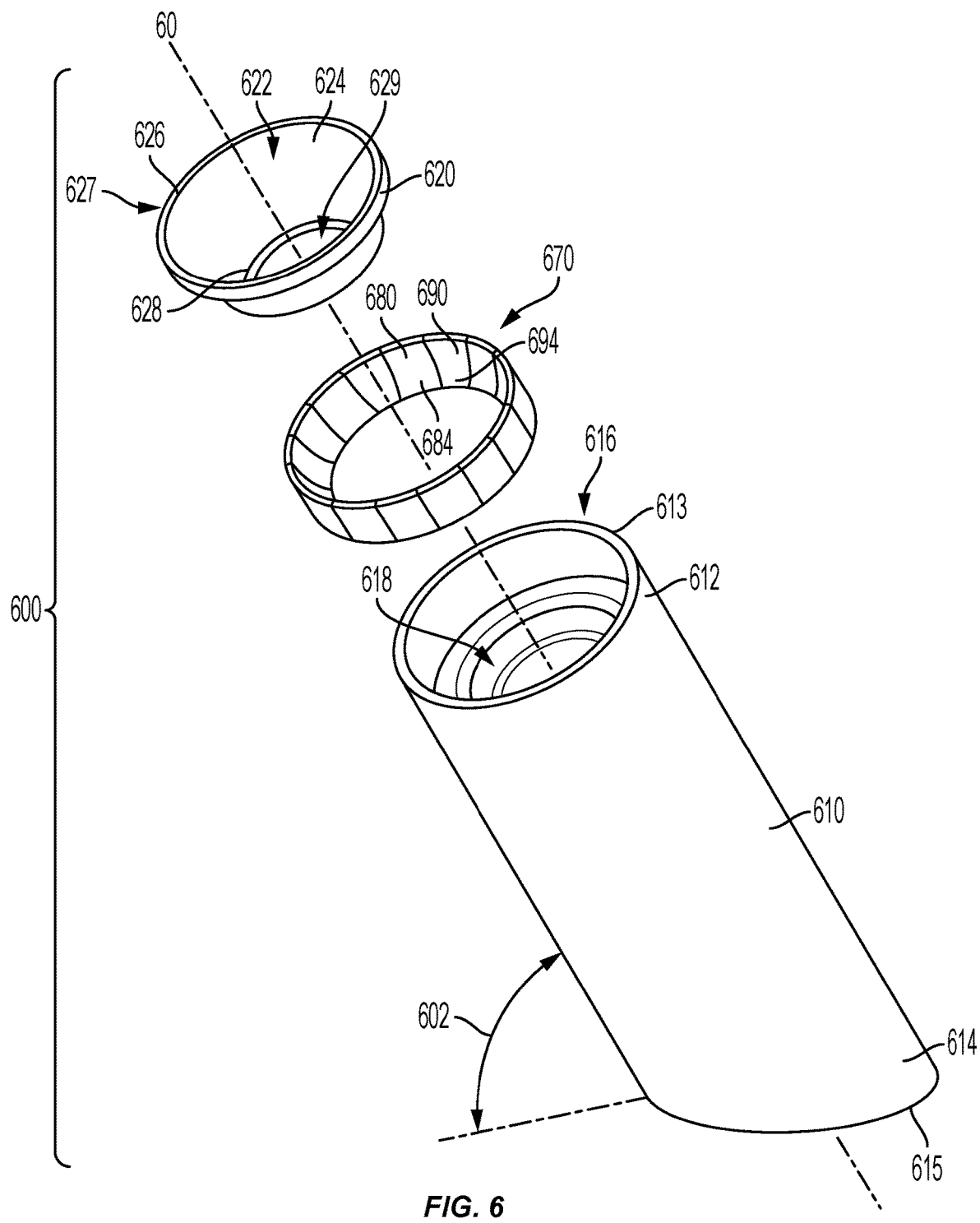
FIG. 6 shows an exploded perspective view of the display stem of FIG. 2.

As shown in FIG. 6, for example, display stem 600 may include a stem body 610 having a first end 612 and a second end 614. Second end 614 may be coupled to retail fixture 20 and first end 612 may extend at an angle 602 relative to retail fixture 20. In some embodiments, angle 602 is an oblique angle. In some embodiments, angle 602 is a right angle. In some embodiments, angle 602 is between approximately 50 and 70 degrees. In some embodiments, angle 602 is approximately 60 degrees. In some embodiments, stem body 610 has a generally cylindrical shape. However, stem body 610 may have other shapes such as, for example, rectangular prismatic, triangular prismatic, frustoconical. In some embodiments, stem body defines a passageway that extends between first end 612 and second end 614 (e.g., thru hole 618). In some embodiments, display stem 600 includes no electrical components. For example, display stem 600 may include only physical components (e.g., stem body 610 and a stem insert 620) and a magnet array 670 (described in further detail below).

First end 612 may include an edge 613 and second end 614 may include an edge 615. In some embodiments, edge 615 may exist in a two-dimensional plane and may be fixed to top surface 21 of retail fixture 20 (e.g., second end 614 may be in contact with top surface 21, such that the two-dimensional plane of edge 615 is parallel with surface 21 at the area of contact). In some embodiments, edge 613 may exist in a two-dimensional plane and may be disposed at an angle 604 relative to edge 615 (see, e.g., FIG. 13). In some embodiments, when retainer 200 is disposed on display stem 600, product 10 is disposed parallel to edge 613 (e.g., parallel to the two-dimensional plane of edge 613, see, e.g., FIG. 13). Thus, in some embodiments, angle 604 defines a display angle of product 10. In some embodiments, display angle 604 is less than approximately 90 degrees. In some embodiments, display angle 604 is between approximately 20 and 70 degrees. In some embodiments, display angle 604 is approximately 55 degrees. In some embodiments, display angle 604 is approximately 30 degrees.

In some embodiments, first end 612 includes an opening 616 that is configured to receive a stem insert 620. In some embodiments, stem insert 620 includes a recess 622 that defines an outer surface 624 and that is configured to receive retainer body 400. In some embodiments, outer surface 624 includes a first perimeter 626 defining a first opening 627. (First perimeter 626 may also define an upper edge of display stem 600.) In some embodiments, outer surface 624 includes a second perimeter 628 defining a second opening 629.

In some embodiments, first perimeter 626 defines a continuous shape, which is to say that first perimeter 626 defines a shape that follows a continuous path without any discontinuities. In some embodiments, first perimeter 626 defines a continuous, smooth shape. In some embodiments, first perimeter 626 defines a continuous shape that exists in a two-dimensional plane. In some embodiments, first perimeter 626 defines a circular shape. In some embodiments, first perimeter 626 defines a circular shape and second perimeter 628 also defines a circular shape. In some embodiments, first perimeter 626 has a diameter that is greater than the diameter of second perimeter 628. In some embodiments, first perimeter 626 and second perimeter 628 are disposed in parallel planes that are spatially displaced along a display stem axis 60. In some embodiments, the center points of first perimeter 626 and second perimeter 628 are aligned with display stem axis 60.

In some embodiments, outer surface 624 is a smooth surface that extends continuously from first perimeter 626 to second perimeter 628. In some embodiments, outer surface 624 is a concave surface. In some embodiments, outer surface 624 is a convex surface. In some embodiments, outer surface 624 includes both a concave and convex portions. In some embodiments, outer surface 624 is continuously curved from first perimeter 626 to second perimeter 628. In some embodiments, outer surface 624 is generally hemispherical in shape. In some embodiments, outer surface 624 is axisymmetric with respect to a display stem axis 60. In some embodiments, when retainer body 400 is disposed in recess 622, retainer body axis 40 is collinear with display stem axis 60. In some embodiments, outer surface 624 has the same shape as outer surface 412 of retainer body 400. This can facilitate the shapes of outer surface 624 and outer surface 412 nesting together, such as when retainer body 400 is received within recess 622.

As shown in FIG. 2, for example, retaining cable 500 may extend through display stem 600. For example, first end 502 of retaining cable 500 may be coupled to retainer 200, and retaining cable 500 may extend through first opening 627, through second opening 629, through thru hole 618, through hole 24 in top surface 21 of retail fixture 20 and into interior space 26 of retail fixture 20, where second end 504 of retaining cable 500 is coupled to cable-retraction unit 700 (described in further detail below).

Smooth outer surface 412 and smooth outer surface 624 may, together, ensure that retainer body 400 automatically seats or retains itself in recess 622 under the tension applied by retaining cable 500, thereby helping to maintain retainer 200 in a desired position (e.g., facing potential purchasers) such that it is not displayed in an off-kilter or dangling position.

Figure 7A:
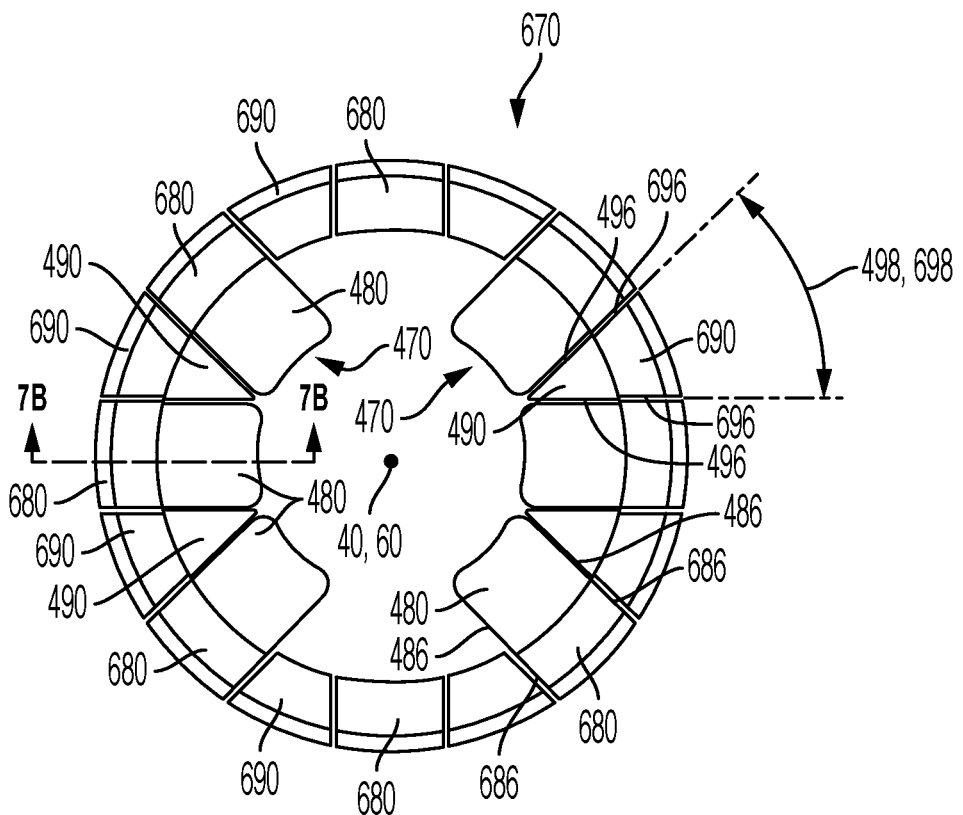
FIG. 7A shows a top view of magnet arrays of the product-display system of FIG. 1.
Figure 7B:
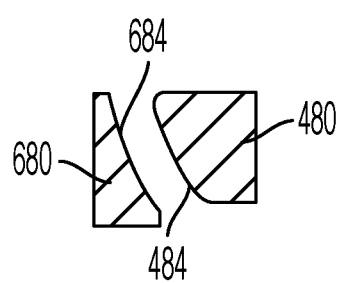
FIG. 7B shows a cross-sectional view taken along line 7-7' of FIG. 7A.
Figure 7C:
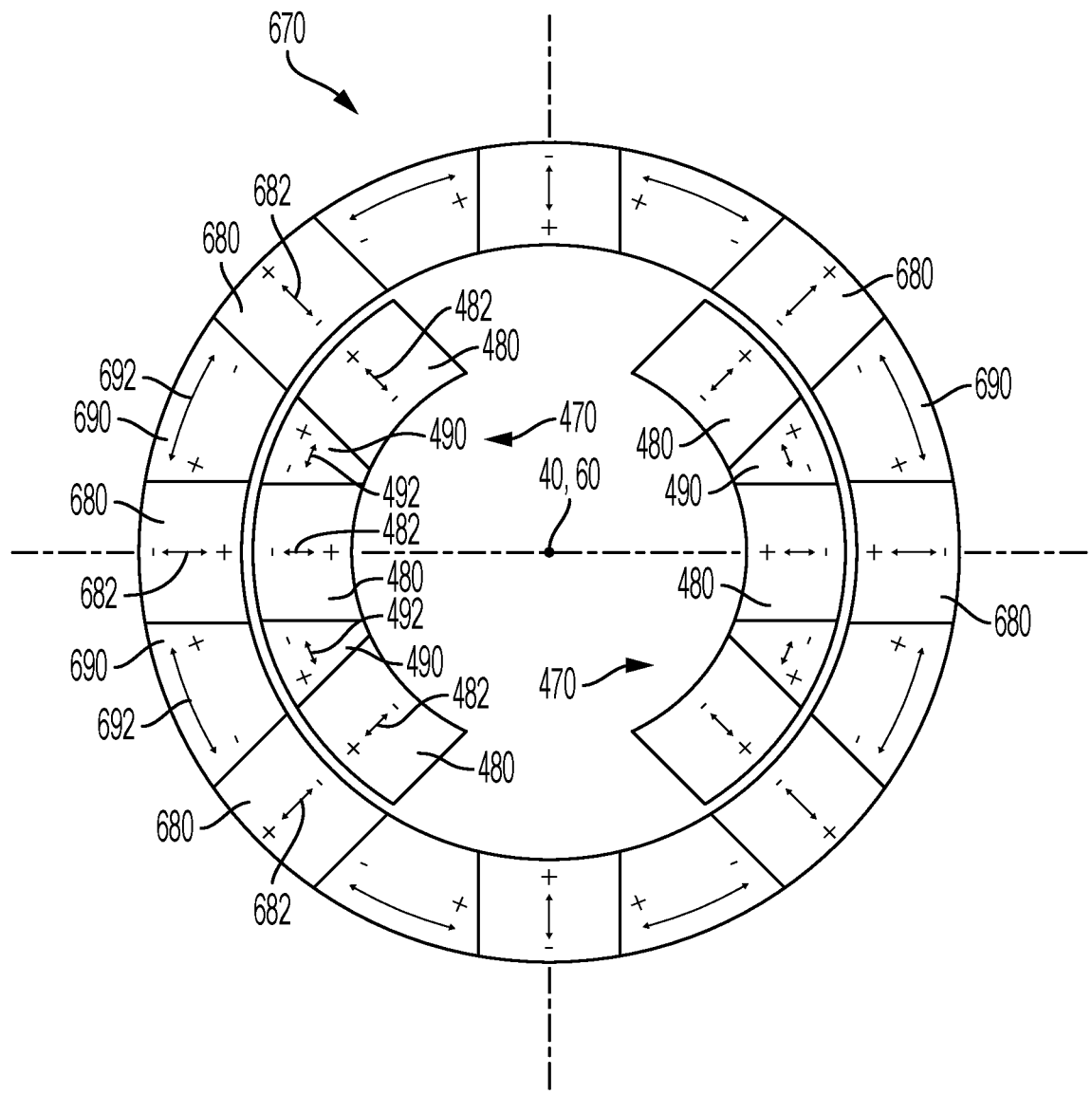
FIG. 7C shows a schematic view of the magnet arrays of FIG. 7A in a first state.
Figure 7D:
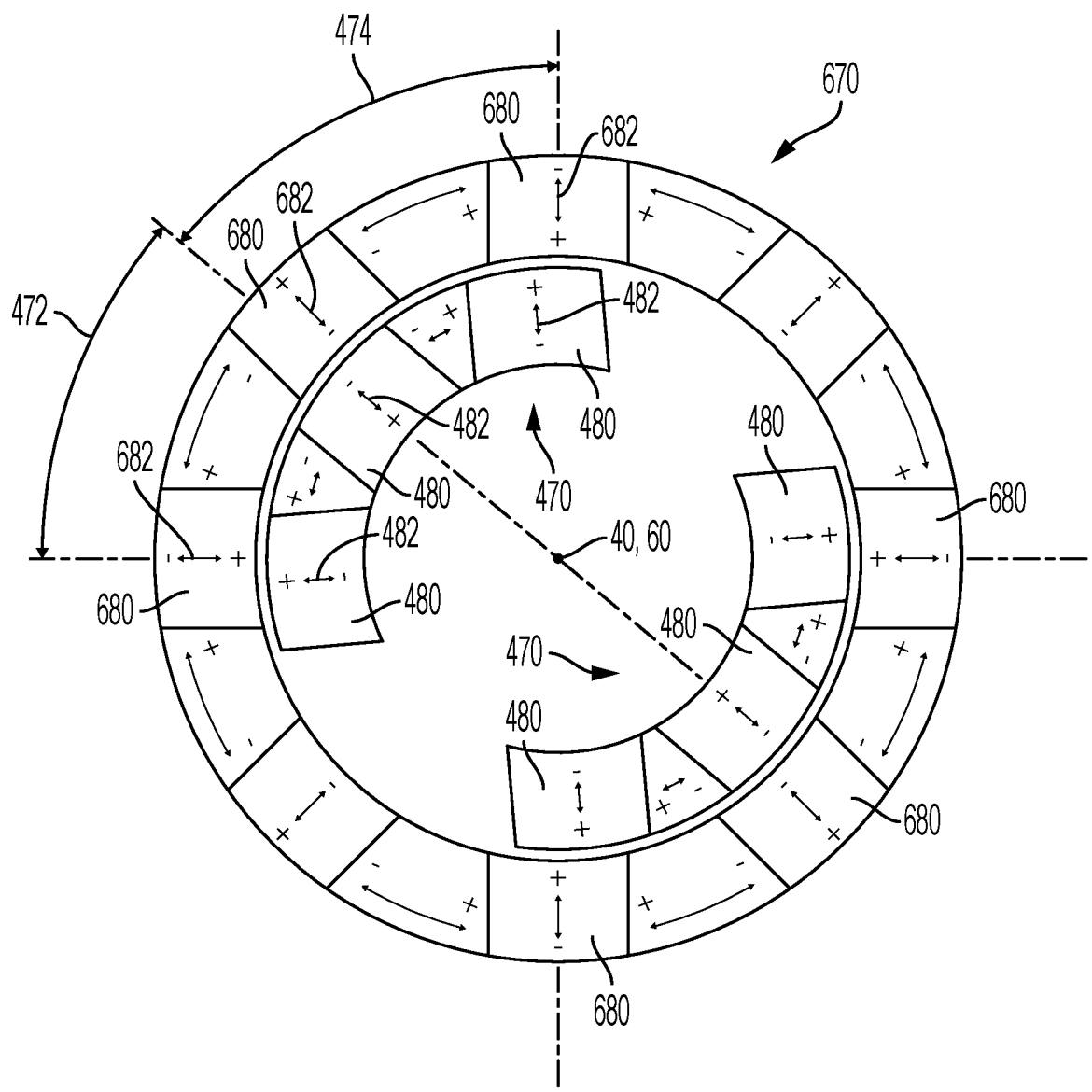
FIG. 7D shows a schematic view of the magnet arrays of FIG. 7A in a second state.
Figure 7E:
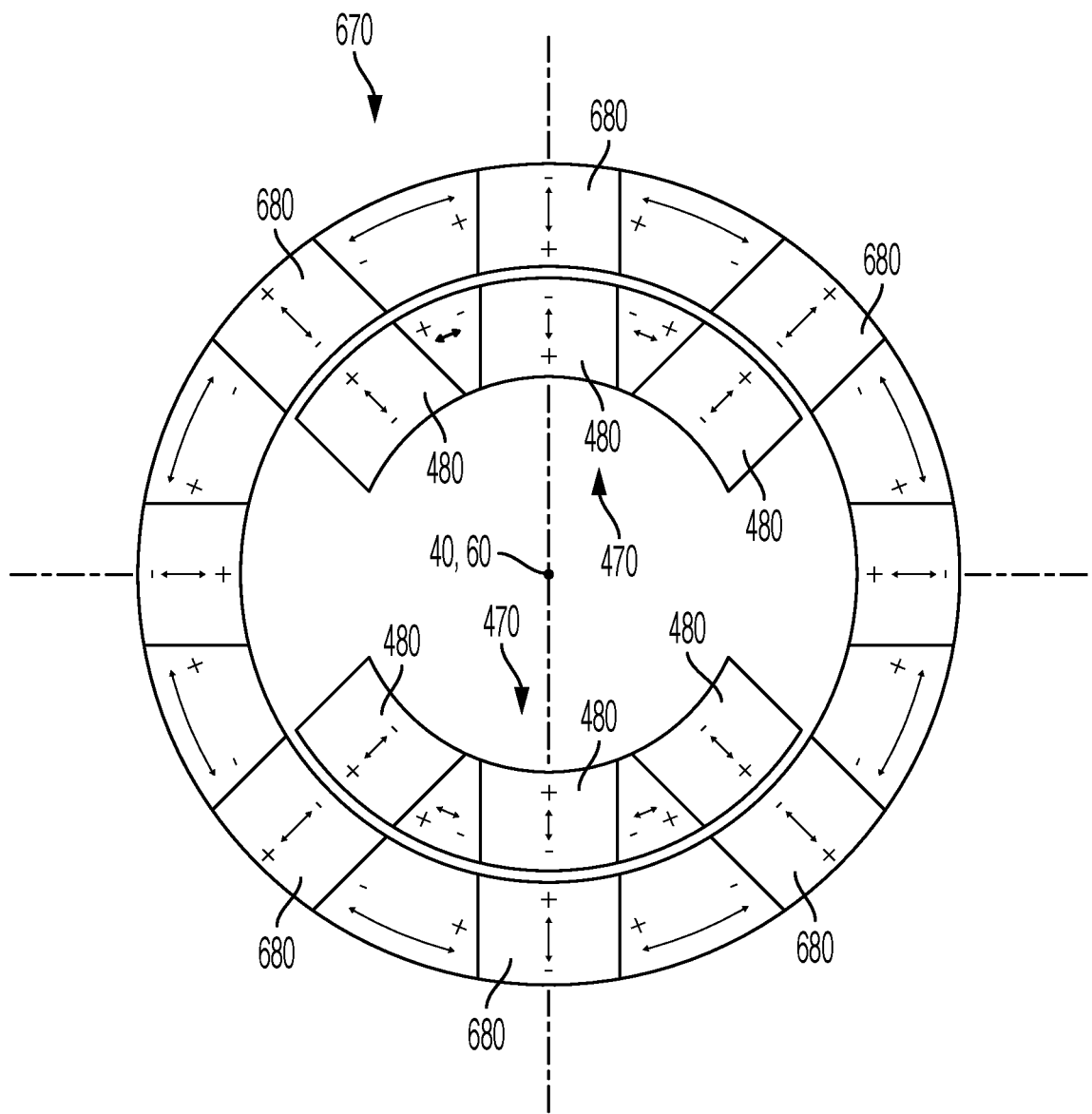
FIG. 7E shows a schematic view of the magnet arrays of FIG. 7A in a third state.

With reference to FIGS. 5A-7E, for example, retainer body 400 and display stem 600 may include magnets for holding and/or aligning retainer 200 on display stem 600. FIGS. 7A and 7B show the relative positions of magnets of both retainer 200 and display stem 600 when retainer body 400 of retainer 200 is received within recess 622 of display stem 600. FIGS. 7C-7E show schematic views of magnets of both retainer 200 and display stem 600 when retainer body 400 of retainer 200 is received within recess 622 of display stem 600. FIGS. 7C-7E includes arrowed lines indicating the magnetic axis of each of the magnets, and also include symbols indicating the positive pole ("+") and negative pole ("−") of each of the magnets. In some embodiments, such magnets, along with retaining cable 500, are configured to hold and/or align retainer 200 on display stem 600.

Retainer body 400 may include a magnet array 470. In some embodiments, magnet array 470 is a Halbach array (i.e., an arrangement of magnets having a rotating pattern of magnetization that augments magnetic field on one side of the array (creating a strong magnetic side) and diminishes magnetic field on the other side of the array (creating a weak magnetic side).

As shown in FIGS. 5A and 7A, for example, magnet array 470 may include three first magnetic elements (e.g., first magnets 480), and two second magnetic elements (e.g., second magnets 490), where the first magnets 480 and second magnets 490 are disposed adjacent to one another in an alternating pattern. In some embodiments, magnet array 470 is disposed in an arc about retainer body axis 40. In some embodiments, retainer body 400 includes two magnet arrays 470 that are each disposed in an arc about retainer body axis 40, where the two magnet arrays 470 are spaced apart from one another, where the two magnet arrays 470 are disposed on opposing sides of retainer body axis 40 (see, e.g., FIG. 5A). In some embodiments, the strong magnetic side of magnet array 470 may be disposed radially outward of the weak magnetic side relative to retainer body axis 40.

As shown in FIG. 7C, for example, first magnets 480 may each have a magnetic axis 482 that is disposed in a radial direction relative to retainer body axis 40. Further, first magnets 480 may have alternating positive and negative polar orientations. For example, one first magnet 480 in magnet array 470 may have a polar orientation where its negative pole is disposed closer to retainer body axis 40 than its positive pole. Then, the next first magnet 480 in magnet array 470 may have a polar orientation where its positive pole is disposed closer to retainer body axis 40 than its negative pole. Then, the pattern may repeat, and the next first magnet 480 in magnet array 470 may have a polar orientation where its negative pole is disposed closer to retainer body axis 40 than its positive pole, and so on. Each magnet array 470 is shown in FIGS. 5A, 7A, and 7C, for example, to include three first magnets 480, however, magnet array 470 may include any number of first magnets 480.

As shown in FIG. 7C, for example, second magnets 490 may each have a magnetic axis 492 that is disposed in a tangential direction (e.g., perpendicular to the radial and axial directions of retainer body axis 40) relative to retainer body axis 40. Further, second magnets 490 may have alternating positive and negative polar orientations. For example, one second magnet 490 in magnet array 470 may have a polar orientation where, relative to retainer body axis 40, its negative pole is disposed facing a clockwise direction relative to its positive pole. Then, the next second magnet 490 in magnet array 470 may have a polar orientation where, relative to retainer body axis 40, its positive pole is disposed facing the clockwise direction relative to its negative pole. Then, the pattern may repeat, and the next second magnet 490 in magnet array 470 may have a polar orientation where, relative to retainer body axis 40, its negative pole is disposed facing the clockwise direction relative to its positive pole, and so on. Each magnet array 470 is shown in FIGS. 5A, 7A, and 7C, for example, to include two second magnets 490, however, magnet array 470 may include any number of second magnets 490.

As mentioned above, first and second magnets 480, 490 may be disposed adjacent to one another in an alternating pattern. For example, one first magnet 480 in magnet array 470 may have a polar orientation where its negative pole is disposed closer to retainer body axis 40 than its positive pole. Then, a second magnet 490 may be disposed adjacent to the first magnet 480 (and displaced clockwise relative to retainer body axis 40) and may have a polar orientation where its negative pole is disposed clockwise relative to its positive pole. Then, another first magnet 480 may be disposed adjacent to the second magnet 490 (and displaced clockwise relative to retainer body axis 40) and may have a polar orientation where its positive pole is disposed closer to retainer body axis 40 than its negative pole. Then, another second magnet 490 may be disposed adjacent to the previous first magnet 480 (and displaced clockwise relative to retainer body axis 40) and may have a polar orientation where its positive pole is disposed clockwise relative to its negative pole. Then, the pattern may repeat, and another first magnet 480 may be disposed adjacent to the previous second magnet 490 (and displaced clockwise relative to retainer body axis 40) and may have a polar orientation where its negative pole is disposed closer to retainer body axis 40 than its positive pole, and so on. Magnet array 470 is shown in FIGS. 5A, 7A, and 7C, for example, to include three first magnets 480 and two second magnets 490, however, magnet array 470 may include any number of alternative first and second magnets 480, 490.

In some embodiments, display stem 600 may also include a magnet array 670. In some embodiments, magnet array 670 is a Halbach array having a rotating pattern of magnetization and having a strong magnet side and a weak magnetic side.

As shown in FIGS. 6 and 7A, for example, magnet array 670 may include eight first magnetic elements (e.g., first magnets 680) and eight second magnetic elements (e.g., second magnets 690), where the first magnets 680 and second magnets 690 are disposed adjacent to one another in an alternating pattern. In some embodiments, magnet array 670 is disposed in a circular pattern about display stem axis 60. In some embodiments, the strong magnetic side of magnet array 670 may be disposed radially inward of the weak magnetic side.

As shown in FIG. 7C, for example, first magnets 680 may each have a magnetic axis 682 that is disposed in a radial direction relative to display stem axis 60. Further, first magnets 680 may have alternating positive and negative polar orientations. For example, one first magnet 680 in magnet array 670 may have a polar orientation where its negative pole is disposed closer to display stem axis 60 than its positive pole. Then, the next first magnet 680 in magnet array 670 may have a polar orientation where its positive pole is disposed closer to display stem axis 60 than its negative pole. Then, the pattern may repeat, and the next first magnet 680 in magnet array 670 may have a polar orientation where its negative pole is disposed closer to display stem axis 60 than its positive pole, and so on. Magnet array 670 is shown in FIGS. 6, 7A, and 7C, for example, to include eight first magnets 680, however, magnet array 670 may include any number of first magnets 680.

As shown in FIG. 7C, for example, second magnets 690 may each have a magnetic axis 692 that is disposed in a tangential direction (e.g., perpendicular to the radial and axial directions of display stem axis 60) relative to display stem axis 60. Further, second magnets 690 may have alternating positive and negative polar orientations. For example, one second magnet 690 in magnet array 670 may have a polar orientation where, relative to display stem axis 60, its negative pole is disposed in a clockwise direction relative to its positive pole. Then, the next second magnet 690 in magnet array 670 may have a polar orientation where, relative to display stem axis 60, its positive pole is disposed in the clockwise direction relative to its negative pole. Then, the pattern may repeat, and the next second magnet 690 in magnet array 670 may have a polar orientation where, relative to display stem axis 60, its negative pole is disposed in the clockwise direction relative to its positive pole, and so on. Magnet array 670 is shown in FIGS. 6, 7A, and 7C, for example, to include eight second magnets 690, however, magnet array 670 may include any number of second magnets 690.

As mentioned above, first and second magnets 680, 690 may be disposed adjacent to one another in an alternating pattern. For example, one first magnet 680 in magnet array 670 may have a polar orientation where its negative pole is disposed closer to display stem axis 60 than its positive pole. Then, a second magnet 690 may be disposed adjacent to the first magnet 680 (and displaced clockwise display stem axis 60) and may have a polar orientation where its negative pole is disposed clockwise relative to its positive pole. Then, another first magnet 680 may be disposed adjacent to the second magnet 690 (and displaced clockwise relative to display stem axis 60) and may have a polar orientation where its positive pole is disposed closer to display stem axis 60 than its negative pole. Then, another second magnet 690 may be disposed adjacent to the previous first magnet 680 (and displaced clockwise relative to display stem axis 60) and may have a polar orientation where its positive pole is disposed clockwise relative to its negative pole. Then, the pattern may repeat, and another first magnet 680 may be disposed adjacent to the previous second magnet 690 (and displaced clockwise relative to display stem axis 60) and may have a polar orientation where its negative pole is disposed closer to display stem axis 60 than its positive pole, and so on. Magnet array 670 is shown in FIGS. 6, 7A, and 7C, for example, to include eight first magnets 680 and eight second magnets 690, however, magnet array 670 may include any number of alternative first and second magnets 680, 690.

Magnetic interaction between magnet arrays 470 and 670 may automatically position and/or orient retainer 200 relative to display stem 600. For example, when retainer body 400 is inserted into recess 622, magnetic interaction between magnet arrays 470 and 670 may serve to automatically orient retainer 200 into one of one or more predefined orientations. Depending on the number of magnets included in magnet arrays 470, 670, any number of predefined orientations may be achieved. For example, in some embodiments where magnet array 470 includes three first magnets 480 and two second magnets 490 (and, optionally, a second magnet array 470 disposed across axis 40 from the first magnet array 470 including three first magnets 480 and two second magnets 490) and where magnet array 670 includes eight first magnets 680 and eight second magnets, magnetic interaction between magnet arrays 470 and 670 may automatically position and/or orient retainer 200 relative to display stem 600 into one of four positions. The four positions may each be separated by approximately 90 degrees (e.g., promoting orientation at 0, 90, 180, and 270 degrees). FIGS. 7C and 7E, for example, show two of the four predefined orientations, as described in further detail below. Such a configuration ensures that product 10 always returns to a vertical or horizontal orientation, which may be more visually-appealing to customers or may be desirable orientations for use of the product.

As mentioned above, in some embodiments, magnetic arrays 470, 670 are Halbach arrays. The rotating pattern of magnetization of magnetic arrays 470, 670 may create a more uniform magnetic attraction between magnetic array 470 and magnetic array 670 than if, for example, the polar orientations of magnets in the arrays were disposed only in radial directions relative to axes 40, 60. A non-uniform magnetic field may, for example, cause retainer 200 to rotate relative to display stem 600 in a bumpy, jolty, or otherwise unsmooth manner, which may detract from a customer's experience when handling and testing the displayed product. By creating a more uniform magnetic attraction between magnetic array 470 and magnetic array 670, retainer 200 may more smoothly rotate between predefined orientations relative to display stem 600.

In some embodiments, each of first magnets 480 includes an outer surface 484 that may be, for example, disposed adjacent to shell 410. In some embodiments, each of first magnets 480 includes a curved outer surface 484 (see, e.g., FIGS. 7A and 7B). In some embodiments, the curvature of outer surface 484 corresponds to at least a portion of outer surface 412 of shell 410 (e.g., the curvature may be convex in at least one direction, and in some embodiments in two directions, as shown). In some embodiments, each of first magnets 480 includes two opposing side surfaces 486, where outer surface 484 is disposed between opposing side surfaces 486. In some embodiments, side surfaces 486 are flat. In some embodiments, side surfaces 486 are disposed parallel to one another.

In some embodiments, each of second magnets 490 includes an outer surface 494 that may be, for example, disposed adjacent to shell 410. In some embodiments, each of second magnets 490 includes a curved outer surface 494 (see, e.g., FIGS. 5A and 7A). In some embodiments, the curvature of outer surface 494 corresponds to at least a portion of outer surface 412 of shell 410 (e.g., the curvature may be convex in at least one direction, and in some embodiments in two directions, as shown). In some embodiments, each of second magnets 490 includes two opposing side surfaces 496, where outer surface 494 is disposed between opposing side surfaces 496. In some embodiments, side surfaces 496 are flat. In some embodiments, side surfaces 496 are disposed at an oblique angle 498 relative to one another. In some embodiments, oblique angle 498 is approximately 45 degrees.

In some embodiments, each of first magnets 680 includes an outer surface 684 that may be, for example, disposed adjacent to stem insert 620. In some embodiments, each of first magnets 680 includes a curved outer surface 684 (see, e.g., FIGS. 7A and 7B). In some embodiments, the curvature of outer surface 684 corresponds to at least a portion of outer surface 624 of recess 622 (e.g., the curvature may be concave in at least one direction, and in some embodiments in two directions, as shown). In some embodiments, each of first magnets 680 include two opposing side surfaces 686, where outer surface 684 is disposed between opposing side surfaces 686. In some embodiments, side surfaces 686 are flat. In some embodiments, side surfaces 686 are disposed parallel to one another.

In some embodiments, each of second magnets 690 includes an outer surface 694 that may be, for example, disposed adjacent to stem insert 620. In some embodiments, each of second magnets 690 includes a curved outer surface 694 (see, e.g., FIGS. 7A and 7B). In some embodiments, the curvature of outer surface 694 corresponds to at least a portion of outer surface 624 of recess 622 (e.g., the curvature may be concave in at least one direction, and in some embodiments in two directions, as shown). In some embodiments, each of second magnets 690 include two opposing side surfaces 696, where outer surface 694 is disposed between opposing side surfaces 696. In some embodiments, side surfaces 696 are flat. In some embodiments, side surfaces 696 are disposed at an oblique angle 698 relative to one another. In some embodiments, oblique angle 698 is approximately 45 degrees. In some embodiments, oblique angle 698 may be equal to oblique angle 498.

In some embodiments, outer surfaces 484, 494 and outer surfaces 684, 694 may have corresponding curvatures (see, e.g., FIGS. 7A and 7B). Such corresponding curvatures may, for example, allow magnets 480, 490 to be disposed more closely to magnets 680, 690, which may increase the magnetic interaction between magnet array 470 and magnet array 670. An increased magnetic interaction may, for example, provide a stronger connection between retainer 200 and display stem 600, or may allow smaller magnets 480, 490, 680, 690 to achieve magnetic attraction that is sufficient to hold and/or orient retainer 200 on display stem 600.

Magnets described herein (e.g., magnets 480, 490, 680 and 690 may include, but are not limited to, rare earth magnets, such as Neodymium magnets, or electromagnets. Magnets described herein (e.g., magnets 480, 490, 680 and 690) may be replaced with material that is attractive to magnets (e.g., ferromagnetic material or ferrimagnetic material). For example, where magnetic interaction is described above between magnets, some of the magnets may be replaced with a magnetically-attractive material.

As mentioned above, magnetic interaction between magnet arrays 470 and 670 may automatically orient retainer 200 relative to display stem 600, for example, into one of one or more predefined orientations. FIG. 7C, for example, shows magnet arrays 470 disposed in one predefined orientation relative to magnet array 670. As shown, in the predefined orientation, the magnetic axis 482 of each of first magnets 480 may be aligned with the magnetic axis 682 of a corresponding first magnet 680 that is disposed adjacent to each of the first magnets 480. Further, the polar orientation of each first magnet 480 may be the opposite of the corresponding first magnet 680 such that corresponding first magnets 480 and 680 attract one another (e.g., the positive pole of a first magnet 480 may be disposed adjacent to the negative pole of a second magnet 680, or vice versa).

When magnet arrays 470 are not in one of the predefined orientations relative to magnet array 670 (see, e.g., FIG. 7D), magnetic interaction between magnet arrays 470 and 670 may cause first magnet arrays 470 to rotate about retainer body axis 40 relative to magnet array 670 and into a predefined orientation. As shown in FIG. 7D, for example, when magnet arrays 470 are not in a predefined orientation, the magnetic axis 482 of each of first magnets 480 may not be aligned with the magnetic axis 682 of an adjacent first magnet 680 and/or the polar orientation of adjacent first magnets 480, 680 may not be opposite one another (e.g., the positive pole of a first magnet 480 may be disposed adjacent to the positive pole of a second magnet 680). Accordingly, magnetic interaction between magnet arrays 470 and 670 may cause magnet arrays 470 to rotate about retainer body axis 40 into one of the predefined orientations relative to magnet array 670.

If a user (e.g., a customer testing a product) removes retainer 200 and product 10 from display stem 600 and then product retainer 200 and product 10 are returned to display stem 600, magnet arrays 470 and 670 may automatically orient product retainer 200 and product 10 relative to display stem 600 (if the product retainer 200 and product 10 are not already in a predefined orientation). For example, if retainer body 400 of retainer 200 is received within recess 622 of display stem 600 such that magnet arrays 470 are not in a predefined orientation (see, e.g., FIG. 7D), magnetic interaction between magnet arrays 470 and 670 may cause retainer body 400 to rotate about retainer body axis 40 to the nearest predefined orientation. Similarly, if a user rotates retainer 200 and product 10 while retainer body 400 is within recess 622 (e.g., when retainer 200 is positioned on display stem 600 as shown, for example, in FIG. 1) and then releases the retainer 200 and product 10, magnetic interaction between magnet arrays 470 and 670 may cause retainer body 400 to rotate about retainer body axis 40 to the nearest predefined orientation (if the product retainer 200 and product 10 are not already in a predefined orientation).

For example, FIG. 7C shows magnet arrays 470 in a first predefined orientation relative to magnet array 670, and FIG. 7E shows magnet arrays 470 in a second predefined orientation relative to magnet array 670. Further, FIG. 7D shows magnet arrays 470 in a non-predefined orientation relative to magnet array 670, where the rotational position of magnet arrays 470 relative to the first predefined orientation is defined by an angle 472, and where the rotational position of magnet arrays 470 relative to the second predefined orientation is defined by an angle 474. If, for example, magnet arrays 470 are positioned as shown in FIG. 7D and are free to rotate about retainer body axis 40 (e.g., after a user has released the product), magnetic interaction between magnet arrays 470 and 670 may cause magnet arrays 470 to rotate about retainer body axis 40 into either one of the predefined orientations depending upon the relative values of angles 472 and 474. For example, if angle 472 is less than angle 474, magnet arrays 470 may rotate about retainer body axis 40 in a counterclockwise direction and into the first predefined orientation shown in FIG. 7C. However, if angle 472 is greater than angle 474, magnet arrays 470 may rotate about retainer body axis 40 in a clockwise direction and into the predefined orientation shown in FIG. 7E.

Figure 8:
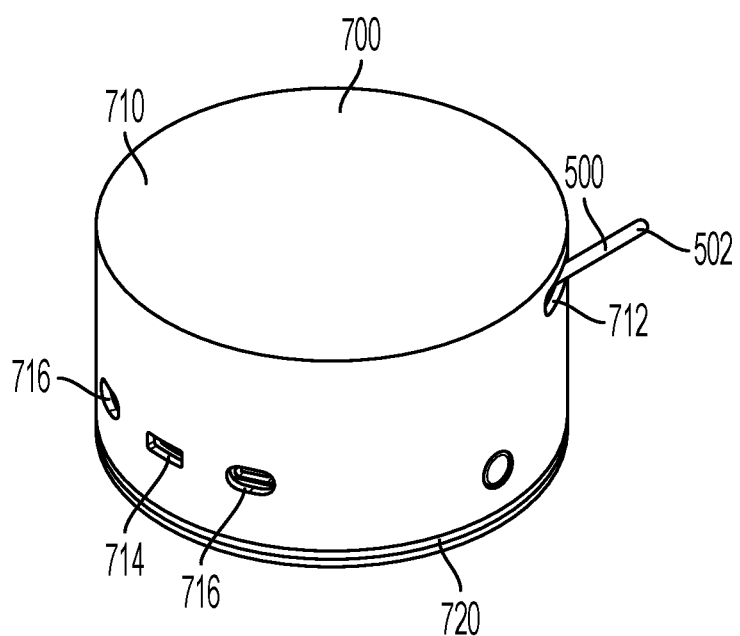
FIG. 8 shows a perspective view of the cable-retraction unit of FIG. 1.
Figure 9:
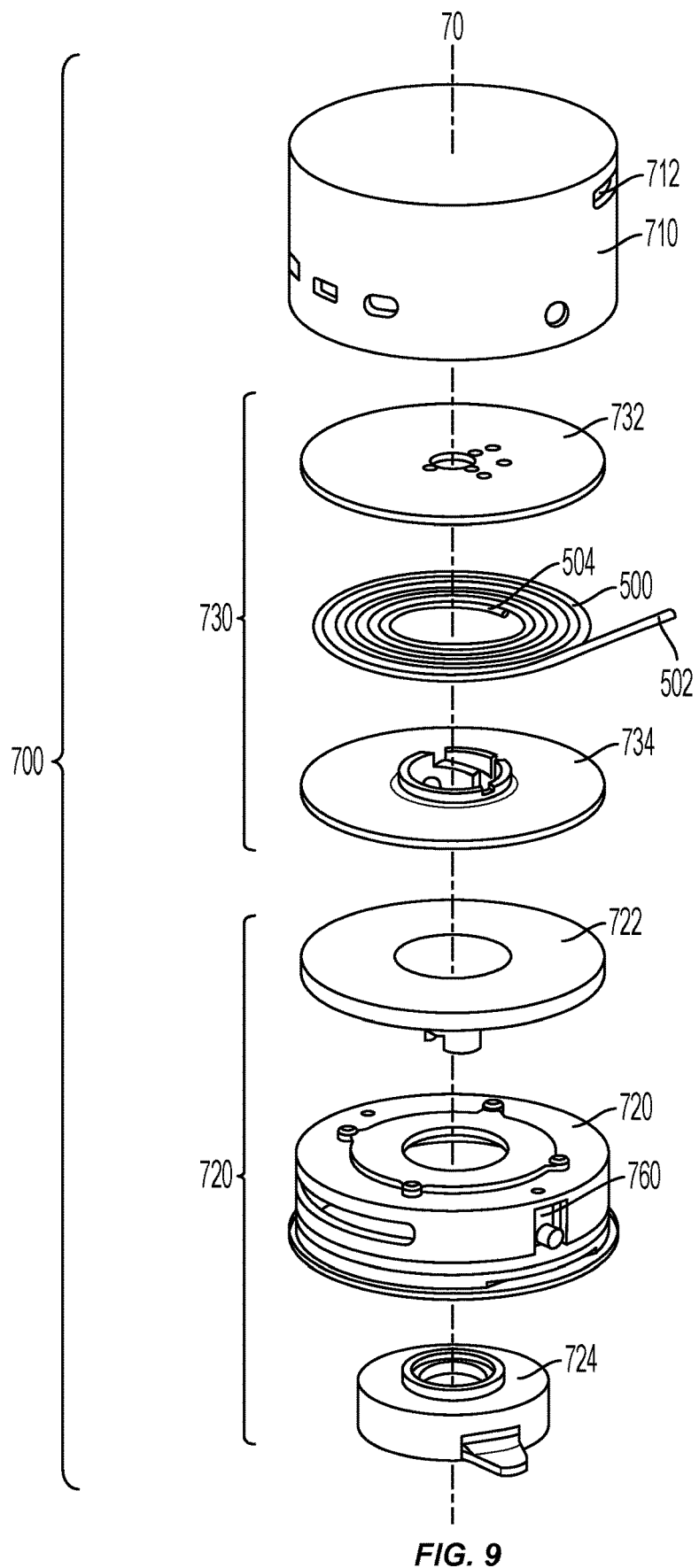
FIG. 9 shows an exploded view of the cable-retraction unit of FIG. 8.

As shown in FIGS. 8 and 9, for example, cable-retraction unit 700 may include a cover 710, a base 720, and a cable spool 730. Cable-retraction unit 700 may be configured to manage retaining cable 500 and/or to return retainer 200 to a predefined position (e.g., on display stem 600) when not being handled by a user.

In some embodiments, base 720 includes a cable-biasing mechanism 724 that is configured to provide a biasing force to retaining cable 500. For example, cable-biasing mechanism 724 may bias cable spool 730 to rotate in a certain direction relative to wind axis 70. Cable-biasing mechanism 724 may bias cable spool 730 to rotate such that retaining cable 500 is biased to wind onto cable spool 730, thereby biasing retaining cable 500 to retract into cable-retraction unit 700. In some embodiments, cable-biasing mechanism 724 provides a constant tension to retaining cable 500 as it is wound and unwound from cable spool 730. In some embodiments, cable-biasing mechanism 724 provides a constant tension to retaining cable 500 through the range of extension of the cable, which is to say that cable-biasing mechanism 724 provides a constant tension to retaining cable 500 when it is at all points between its minimum extended length and maximum extended length. In some embodiments, cable-biasing mechanism 726 includes a spring such as, for example, a torsional spring. In some embodiments, cable-biasing mechanism 726 includes a constant tension spring. In some embodiments, cable-biasing mechanism includes one or more motors (e.g., electric motors) that are configured to provide tension to retaining cable 500.

Cover 710 may be generally cylindrical in shape and may include a cable opening 712 though which retaining cable 500 may extend from as it is wound and unwound from cable spool 730, for example. In some embodiments, cable spool 730 includes an upper portion 732 (e.g., a disc with a diameter greater than that of fully-wound cable 500) and a lower portion 734 (e.g., a disc with a diameter greater than that of fully-wound cable 500) that are configured to guide retaining cable 500 as it is wound and unwound from cable spool 730. In some embodiments, cable spool 730 may be coupled to rotation tray 722, where rotation tray 722 is coupled to and biased by cable-biasing mechanism 724.

In some embodiments, cable spool 730 may be configured such that retaining cable 500 is wound onto cable spool 730 in a single layer, which is to say that retaining cable 500 is wound spirally about a wind axis 70 in a single plane (see, e.g., retaining cable 500 in FIG. 9). Winding retaining cable 500 in single layer may help retaining cable 500 to unwind from cable spool 730 smoothly. For example, if retaining cable 500 were not wound in a single layer, retaining cable 500 may cross and/or overlap itself as it is wound onto cable spool 730. Such cable-crossing and/or overlapping may create inconsistent tensioning in the retaining cable 500 as it is unwound from cable spool 730. When a user lifts retainer 200 from display stem 600 such inconsistent tension may cause the cable to unwind in a bumpy, jolty, or otherwise unsmooth manner, which may detract from a customer's experience when handling and testing the displayed product. Thus, by winding retaining cable 500 in a single layer and biasing retaining cable 500 to retract with a constant tension using cable-biasing mechanism 724, retaining cable 500 may wind and unwind from cable spool 730 in a smooth, consistent manner. Smoothly winding and unwinding retaining cable 500 may also help to prolong the life and fidelity of the cable, for example, by reducing the amount of wear on the cable as a result of cycling the cable in an out of cable-retraction unit 700 over time. Cable 500 may be wound in a single layer due, in some embodiments, to the spacing of upper portion 732 and lower portion 734, which—as mentioned above—may be formed as discs. The wound cable 500 may occupy the space between upper portion 732 and lower portion 734. To help prevent cable from winding in other than a single layer, upper portion 732 may be spaced away from lower portion 734 by less than twice the diameter of cable 500 (e.g., less than 1.5 times the diameter of cable 500, or by the diameter of cable 500).

As shown in FIG. 1, for example, in some embodiments, retaining cable 500 may extend across a pulley 752 of pulley assembly 750 between cable-retraction unit 700 and display stem 600. In some embodiments, retaining cable 500 is wound onto cable spool 730 about a substantially vertical wind axis 70. However, display stem 600 and retainer 200 may be disposed vertically above cable-retraction unit 700

(e.g., above top surface 21 of retail fixture 20). Thus, pulley 752 may be used to adjust the orientation of retaining cable 500 from extending in a substantially horizontal direction to a substantially vertical direction before retaining cable 500 extends through display stem 600. In some embodiments, pulley assembly 750 may also be used to couple display stem 600 to retail fixture 20. For example, pulley assembly 750 and display stem 600 may be disposed on opposing sides of top surface 21 of retail fixture 20. One or more fasteners may extend between pulley assembly 750 and display stem 600, thereby coupling display stem 600 to top surface 21.

In some embodiments, cable spool 730 and/or retaining cable 500 are removable and replaceable, which may increase the modularity of product-display system 100. For example, if retaining cable 500 becomes damaged (e.g., due to fatigue from cycling the cable), the cable and/or cable spool may be replaced individually rather than replacing the entire cable-retraction unit 700. Similarly, if a new type of product 10 or different retainer 200 configuration is need, for example, a different retaining cable 500 (e.g., with a different type of cable plug 510) may be substituted in cable-retraction unit 700 rather than replacing the entire unit.

In some embodiments, cable-retraction unit 700 may include a control unit 760 that is configured to control certain operations of cable-retraction unit 700 and/or product 10. For example, control unit 760 may be configured to detect the type of product 10 that is disposed on retainer 200. For example, control unit 760 may receive electronic data from a voltage sensor that is electrically coupled to product 10, and may determine the power to supply to product 10 based on the electronic data received from the voltage sensor. In some embodiments, control unit 760 may receive electronic data from product 10 and may determine the power to supply to product 10 based on the electronic data received from the product 10. Control unit 760 may be or may include, for example, an electronic device for storing and processing electronic data according to instructions given to it in a program. Control unit 760 may be or may include, for example, a computer, microcontroller, or the like. Control unit 760 may include, for example, a processor, memory, and communication infrastructure for sending and receiving electronic data.

In some embodiments, control unit 760 may adjust the amount of power transmitted through retaining cable 500 to compensate for damage to retaining cable 500 (e.g., from fatigue). For example, a partial fracture in a conductor of retaining cable 500 may decrease the efficiency of power transmission of retaining cable 500 and may cause an increased voltage drop across retaining cable 500. Accordingly, control unit 760 may use electronic data received from a voltage sensor, for example, to detect an increased voltage drop across retaining cable 500. Control unit 760 may then, for example, increase the amount of power transmitted through retaining cable 500 to compensate from the damage conductor. Such a configuration may extend the useable lifespan of a retaining cable 500, and may help to ensure that product 10 receives the correct power supply.

As mentioned above, product-display system 100 (e.g., via device 384, see, e.g., FIG. 3A) may be configured to monitor characteristics (e.g., the voltage) of the power provided to product 10 via retaining cable 500. For example, one or more inputs of processing device 384 (e.g., input pins or ports) may be electrically coupled to, for example, one or more bracket contacts 378 (e.g., the bracket contacts 378 that are used to transmit power to product 10) and/or to one or more conductors of bracket cable 370 (e.g., the conductors of bracket cable 370 that are used to transmit power to product 10). Processing device 384 may, for example, measure the voltage difference between two bracket contacts 378 and/or two conductors of bracket cable 370 in order to determine the voltage of the power being provided to product 10. Processing device 384 may then transmit to cable-retraction unit 700 (e.g., via retaining cable 500) electronic data that includes the measured voltage of the power being provided to product 10. In some embodiments, a computing device of product-display system 100 (e.g., control unit 760 of cable-retraction unit 700) may receive the electronic data from processing device 384 and compare the measured voltage received by processing device 384 to the output voltage of cable-retraction unit 700. In some embodiments, the output voltage of cable-retraction unit 700 may be determined by control unit 760, for example. If the measured voltage received by processing device 384 is different (e.g., greater than a threshold acceptable difference) than the output voltage of cable-retraction unit 700, control unit 760 of cable-retraction unit 700, power module 740, or other power controller of product-display system 100, for example, may adjust the characteristics (e.g., voltage, current, etc.) of power transmitted through retaining cable 500 in order to compensate for the determined difference. As mentioned above, such a configuration may be used, for example, to compensate for damage to conductors of retaining cable 500, and may help to ensure that product 10 receives the correct power supply.

As mentioned above, processing device 384 may also be configured to translate electronic data from one communication protocol to another. For example, cable-retraction unit 700 may be configured to send and receive electronic data using a first communication protocol (e.g., using a universal asynchronous receiver-transmitter ("UART")), but product 10 may be configured to send and receive electronic data using a different communication protocol (e.g., a product-specific standard). Thus, processing device 384 may translate electronic data received from cable-retraction unit 700 into electronic data that may be understood by product 10, or vice versa. In this manner, processing device 384 may permit a wide range of products 10 to communicate with cable-retraction unit 700, since the data received by cable-retraction unit 700 may be consistent and independent of the data preferences or requirements of product 10.

In some embodiments, cable-retraction unit 700 includes a power port 716 though which cable-retraction unit 700 may receive power from a power module 740. In some embodiments, cable-retraction unit 700 includes more than one power port 716. For example, cable-retraction unit 700 may include two power ports 716, where one power port 716 may be configured to receive power from power module 740, and the other power port 716 may be configured to send power to another cable-retraction unit 700. In this manner, several cable-retraction units 700 may be daisy-chained together such that two or more cable-retraction units 700 may receive power using a single power module 740.

In some embodiments, power modules 740 may be connected to a common power bus 802 (see, e.g., FIG. 10) that may be, for example, connected to grid power and may provide power (e.g., AC power) to retail fixture 20. Power modules 740 may, for example, convert power from one form to another (e.g., from AC power to DC power). In some embodiments, power modules 740 may be sized such that they may provide power to a range of products 10 having a range of power requirements (e.g., smart watches, smartphones, tablet computer, and laptop computers). Thus, each power module 740 and cable-retraction unit 700 may not be limited to powering and securing a particular product 10 or type of products 10 (e.g., smartphones). In this manner, the type and/or arrangement of products 10 being displayed may be easily reconfigured without changes to cable-retraction unit 700 and/or to power module 740.

Figure 10:
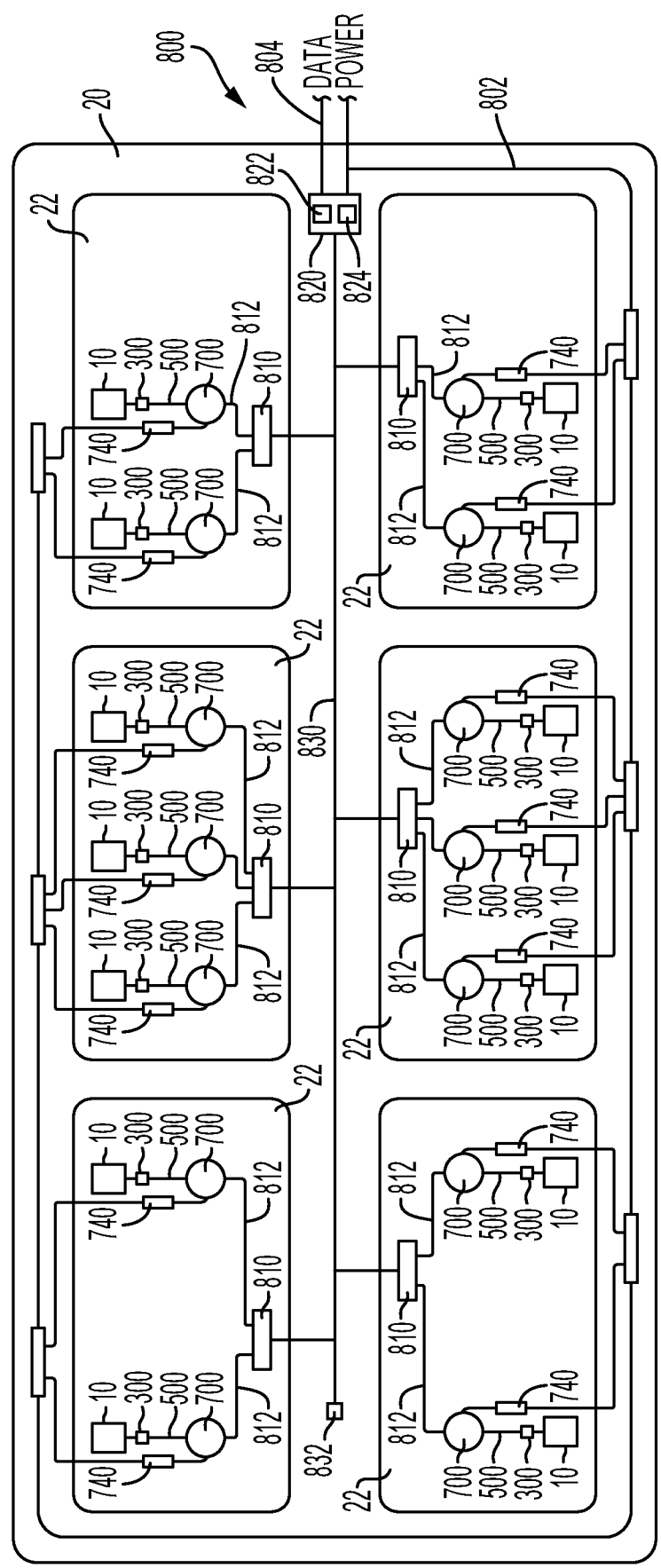
FIG. 10 shows a schematic view of the product-display system of FIG. 1.

As shown in FIG. 10, for example, product-display system 100 may include a security system 800. Security system 800 may be configured, for example, to detect if product 10 has been disconnected from product-display system 100 and/or if portions of product display system 100 (e.g., product retainer 200 with product 10 retained therein) have been disconnected from retail fixture 20. As described in further detail below, products 10 themselves may also be configured to detect if they have been disconnected from retail fixture 20.

Security system 800 may include a central alarm module 820 and one or more remote alarm modules 810. In some embodiments, a retail fixture 20 includes one central alarm module 820 and includes one or more remote alarm modules 810 that are spatially displaced from the central alarm module 820 and provide security to certain products 10 on retail fixture 20. For example, in some embodiments, retail fixture 20 includes one remote alarm module 810 that corresponds to each of the display mats 22 of retail fixture 20 (as shown, in FIG. 10 for example). In some embodiments, each remote alarm module may be electrically coupled to one or more cable-retraction units 700 using, for example, alarm module port 714 (see FIG. 8). Thus, one remote alarm module 810 may provide security to several products 10 simultaneously.

In some embodiments, central alarm module 820 and/or remote alarm modules 810 include backup batteries 824 that may allow security system 800 to remain powered during a power outage, for example, where power bus 802 is not providing power to retail fixture 20.

In some embodiments, remote alarm modules 810 are electrically coupled to central alarm module 820 using a bus cable 830. Bus cable 830 may be configured such that electronic data may be sent between remote alarm modules 810 and central alarm module 820, and/or from one remote alarm module 810 to another. In some embodiments, one or more remote alarm modules 810 are electrically coupled to central alarm module 820 and to one another using a single bus cable 830. In some embodiments, remote alarm modules 810 may also receive power from central alarm module 820 (or a separate power supply) via bus cable 830. Such a configuration may increase the modularity and re-configurability of the system to accommodate various numbers of products 10 and/or differently-configured retail fixtures 20.

Bus cable 830 may be, for example, one or more electrical conductors that may allow multiple devices (e.g., remote alarm modules 810 and central alarm module 820) to be connected in such a way that each device connected to bus cable 830 may send electronic data to, and receive electronic data from, every other device connected to bus cable 830. Bus cable 830 may be or may include, for example, a controller area network ("CAN") cable, an RS-485 cable, an Ethernet cable, or other data bus cable capable of transmitting electronic data (e.g., computer-processable data and/or information represented by an analog or digital signal). In some embodiments, remote alarm modules 810 and central alarm module 820 may be configured to communicate wirelessly and may operate on a variety of frequencies, such as Very High Frequency (e.g., between 30 MHz and 300 MHz) or Ultra High Frequency (e.g., between 300 MHz and 3 GHz) ranges, and may be compatible with certain network standards such as cell phone, power-line communication, WIFI™, or BLUETOOTH® wireless networks, for example.

In some embodiments, remote alarm modules 810 and central alarm module 820 may be configured to communicate via both a wired and a wireless connection. For example, electronic data related to device security (e.g., device arm and disarm commands) may be sent using only a wired connection, and other electronic data (e.g., event logs and diagnostics information) or data requiring a large amount of bandwidth may be sent using a wireless connection.

In some embodiments, alarm modules 810 and 820 include control units. The control units of alarm modules 810, 820 may be similar to control unit 760 described above. The control units may be or may include, for example, an electronic device for storing and processing electronic data according to instructions given to it in a program. The control units may be or may include, for example, a computer, microcontroller, or the like. The control units may include, for example, a processor, memory, and communication infrastructure for sending and receiving electronic data. Alarm modules 810 and 820 may each include a communication controller (e.g., a CAN controller) and a transceiver (e.g., a CAN transceiver) that may permit electronic data to be sent between devices according to a particular communication protocol (e.g., CAN).

As shown in FIG. 10, for example, cable-retraction units 700 may be electrically coupled to remote alarm module 810 using a data cable 812. In some embodiments, each cable-retraction unit 700 is connected to a remote alarm module 810 via its own data cable 812. In some embodiments, several cable-retraction units 700 are connected to a remote alarm module 810 using a single data cable 812 (e.g., a bus data cable). Data cable 812 may be configured such that electronic data may be sent between cable-retraction units 700 and remote alarm module 810 and/or from one cable-retraction unit 700 to another. Data cable 812 may be or may include, for example, a controller area network ("CAN") cable, an RS-485 cable, an Ethernet cable, or other data cable or data bus cable capable of transmitting electronic data. In some embodiments, cable-retraction unit 700 and remote alarm module 810 may be configured to communicate wirelessly and may operate on a variety of frequencies, such as Very High Frequency (e.g., between 30 MHz and 300 MHz) or Ultra High Frequency (e.g., between 300 MHz and 3 GHz) ranges, and may be compatible with certain network standards such as cell phone, power-line communication, WIFI™, or BLUETOOTH® wireless networks, for example.

In some embodiments, cable-retraction units 700 and remote alarm modules 810 may be configured to communicate via both a wired and a wireless connection. For example, electronic data related to device security (e.g., device arm and disarm commands) may be sent using only a wired connection, and other electronic data (e.g., event logs and diagnostics information) or data requiring a large amount of bandwidth may be sent using a wireless connection.

As mentioned above, remote alarm module 810 may include a communication controller (e.g., a CAN controller) and a transceiver (e.g., a CAN transceiver). Likewise control unit 760 described above may also include a communication controller (e.g., a CAN controller) and a transceiver (e.g., a CAN transceiver) such that electronic data may be sent between remote alarm module 810 and cable-retraction unit 700 according to a particular communication protocol (e.g., CAN).

Central alarm module 820, remote alarm modules 810, cable-retraction units 700 and/or products 10 may together form a communication network. The communication network may be, for example, a network where one device (e.g., central alarm module 820) may send electronic data (e.g., directly or indirectly) to one or more other devices (e.g., remote alarm modules 810, cable-retraction units 700, and/or products 10) on the network.

In some embodiments, central alarm module 820 is configured to directly send electronic data to and/or receive electronic data from product 10 through a direct electrical connection between central alarm module 820 and product 10, for example. In some embodiments, central alarm module 820 is configured to indirectly send electronic data to and/or receive electronic data from product 10 through an indirect electrical connection between central alarm module 820 and product 10 (e.g., via remote alarm module 810 and/or cable-retraction unit 700). For example, electronic data may be transmitted from central alarm module 820 to remote alarm module 810. Then, electronic data may be transmitted from remote alarm module to cable-retraction unit 700. Then, electronic data may be transmitted from cable-retraction unit 700, through retaining cable 500, then through cable plug 510, then through cable port 460, then through body contacts 438, then through bracket contacts 378, then through bracket cable 370, then through bracket connector 380, where the electronic data may finally be received by product 10. As described above, each of the elements in this series may be electrically coupled to one another. In some embodiments, other components may be electrically disposed between the described elements in the series. Similarly, electronic data may be sent from product 10 to central alarm module 820 following the reverse path. Further, electronic data may be sent between remote alarm module 810 and product 10, between cable-retraction unit 700 and product 10, between remote alarm module 810 and cable-retraction unit 700, and/or between other devices of security system 800 using portions of the electrical path described above.

In some embodiments, central alarm module 820, remote alarm modules 810, cable-retraction units 700, and/or products 10 are configured to send electronic data to one another in the form of messages (e.g., frames, message frames, data frames, or the like). As mentioned above, electronic data sent via bus cable 830 (e.g., by central alarm module 820) may be received by all devices connected to bus cable 830 (e.g., remote alarm modules 810). However, in some cases, a message sent via bus cable 830 may include commands and/or information intended for a particular device in the network, rather than all devices in the network. Thus, the messages may include identification information (e.g., a serial number) that indicates for which device the message is intended.

For example, central alarm module 820 may send a message that is intended for a particular remote alarm module 810 and/or a particular product 10, and the message may include identification information (e.g., a serial number) that is unique to the particular remote alarm module 810 and/or to the particular product 10. When a message is sent via bus cable 830, each remote alarm module 810 connected to bus cable 830 may receive the message, and use the identification information within the message to determine if the message is intended for it or intended for a product 10 that is connected to it. If the remote alarm module 810 determines that the message was intended for it, the remote alarm module 810 may then proceed to follow the commands sent along with the message. If the remote alarm module 810 determines that the message was intended for a product 10 that is connected to it, the remote alarm module 810 may then relay the message to the particular product 10 (e.g., via data cable 812 and cable-retraction unit 700). If the remote alarm module 810 determines that the message was not intended for it and not intended for a product 10 that is connected to it, the remote alarm module 810 may ignore the commands sent along with the message. In some embodiments, the message may include identification information for more than one remote alarm module 810 and/or product 10, such that several remote alarm modules 810 and/or products 10 may follow the commands sent with the single message. In some embodiments, the message may include no identification information (or information indicating that the message is intended for all remote alarm modules 810 and/or products 10) and, in such a case, all remote alarm modules 810 and/or products 10 may follow the commands send with the message.

Messages sent between central alarm module 820, remote alarm modules 810, cable-retraction units 700 and/or products 10 may include, for example, arm and disarm commands, event logs, diagnostics information, and/or other information related to security system 800, product display system 100, and/or products 10.

In some embodiments, central alarm module 820 includes a control module 822 for arming and disarming security system 800. In some embodiments, control module 822 may include a radio-frequency identification ("RFID") reader, a near-field communication ("NFC") reader or the like, that may be used to arm and disarm security system using, for example, an RFID card, a smart card, or an NFC enable device (e.g., a smartphone). In some embodiments, when control module 822 detects an authorized key (e.g., an authorized RFID card, smart card, or NFC enable device) central alarm module 820 may send a message to remote alarm modules 810, cable-retraction units 700, and/or products 10 that may include an arm or disarm command that may, for example, cause remote alarm modules 810, cable-retraction units 700, and/or products 10 to change from an armed state to a disarmed state, or vice versa.

In some embodiments, a remote device (e.g., a remote server) may be used to arm and disarm security system 800 and may be connected to security system 800, for example, via an external data connection 804. The remote device may also, for example, log event data, diagnostics information, and/or other information related to security system 800, product display system 100, and/or products 10.

In some embodiments, products 10 may be used to arm and/or disarm security system 800. For example, a user (e.g., an employee) may use a special application, menu, or the like on one of products 10 in order to send arm and/or disarm commands to other products 10 and/or alarm modules 810 and 820. The employee may be required to enter a special passcode (e.g., entered via a user interface of product 10) in order to send the arm and/or disarm commands. In some embodiments, product 10 may include biological sensors (e.g., a fingerprint detector or face detector) that may be used to determine the identity of the employee. If product 10 determines that the employee is authorized, product 10 may permit the employee to send the arm and/or disarm commands from the device.

In some embodiments, all products 10 of retail fixture 20 may be armed and/or disarmed simultaneously. However, in some cases, it may be desirable to disarm only one product 10, or several products 10, rather than disarming the entire retail fixture 20. Thus, in some embodiments, individual products 10 or a subset or products 10 of retail fixture 20 may be armed and/or disarmed while the state of other products 10 of retail fixture 20 remain unchanged. Accordingly, as described above, messages including arm and disarm commands may also include identifying information (e.g., a serial number) indicating which products 10 should be armed or disarmed.

In some embodiments, electrical disconnection between any of, for example, central alarm module 820 and remote alarm module 810, remote alarm module 810 and cable-retraction unit 700, cable-retraction unit 700 and retaining cable 500, retaining cable 500 and cable plug 510, cable plug 510 and cable port 460, cable port 460 and body contacts 438, body contacts 438 and bracket contacts 378, bracket contacts 378 and bracket cable 370, bracket cable 370 and bracket connector 380, and/or bracket connector 380 and product 10 may cause an alarm to be triggered if product 10 is in an armed state. If, for example, either of alarm modules 810, 820 determine that product 10 is no longer sending and/or receiving data, an alarm may be triggered. Similarly, if either of alarm modules 810, 820 determine that product 10 is no longer receiving power, an alarm may be triggered.

In some embodiments, alarm module 810, 820 may delay triggering an alarm after an electrical disconnection with product 10 is detected. For example, after an electrical disconnection is detected, alarm module 810, 820 may wait for a preset amount of time before triggering an alarm. If during the preset amount of time an electrical connection is reestablished with product 10, the alarm module may no longer trigger an alarm. Such a configuration may, for example, decrease false alarms due to temporary loss of electrical connection.

Central alarm module 820, remote alarm modules 810, and/or cable-retraction units 700 may store in their internal memory, for example, information related to the state (e.g., armed or disarmed) of products 10. For example, remote alarm module 810 may maintain a list of products 10 that are connected to it and whether or not they are in an armed state or a disarmed state. Remote alarm module 810 may update the list of products 10 and their state based on, for example, the arm and disarm commands sent by central alarm module 820, cable-retraction units 700, and/or products 10. If remote alarm module 810 detects that a product 10 is no longer connected to retail fixture 20, remote alarm module 810 may check if that product 10 is currently in an armed or disarmed state. If remote alarm module 810 determines that product 10 is in an armed state, remote alarm module 810 may then send an alarm message to central alarm module 820 (e.g., indicating that an alarm should be triggered). The alarm message may indicate that a product 10 has been disconnected from a retail fixture 20 without authorization. In some embodiments the alarm message may identify the particular product 10 that has been disconnected and/or retail fixture 20 that it has been disconnected from.

In some embodiments, when central alarm module 820 receives an alarm message from remote alarm module 810 (e.g., indicating that an armed product 10 has been disconnected from retail fixture 20 without authorization), central alarm module 820 may make a determination as to how the alarm should be triggered. For example, in some embodiments, characteristics of the alarm may be variable dependent on the circumstances that triggered the alarm. For example, the characteristics of the alarm may be dependent upon the severity of the security breach. For example, if a remote alarm module 810 indicates to central alarm module 820 that a product 10 has been disconnected from retail fixture 20, central alarm module 820 may, for example trigger a silent alarm that may quietly notify one or more employees of the breach. However, if one or more remote alarm modules 810 indicates that several products 10 have been disconnected from retail fixture 20, central alarm module 820 may, for example, trigger an audible alarm. Accordingly, security system 800 may be customized to fit the retail environment in which it is being implemented.

In some embodiments, products 10 may also store in their internal memory information related to their own state (e.g., arm or disarmed). For example, product 10 may maintain a record of whether or not it is in an armed state or a disarmed state may update the record based on, for example, the arm and disarm commands sent by central alarm module 820, remote alarm module 810, cable-retraction unit 700, and/or other products 10. If product 10 detects that it is no longer connected to retail fixture 20, product 10 may check if it is currently in an armed or disarmed state. If product 10 determines it is in an armed state, product 10 may then trigger an alarm and/or may enter an alarming mode.

In some embodiments, in an alarming mode, product 10 may emit an audible alarm, display warnings or other graphics (e.g., on its display screen), or perform other action in order to draw attention to product 10. In some embodiments, in an alarming mode, the processing capabilities of product 10 may be used to alter the functionality of product 10. For example, product 10 may disable user interactions (e.g., by disabling user interfaces of the device), erase the memory or the product 10, and/or require a password in order to boot the device. In this manner, since product 10 may become unusable to an unauthorized user, the value of product 10 may be decreased, which may deter unscrupulous persons from stealing products 10. In some embodiments, in an alarming mode, product 10 may also automatically transmit information to remote devices (e.g., message with location information) in order to aid in recovery of product 10.

As mentioned above, alarm modules 810, 820 may include backup batteries 824 that may allow security system 800 to remain powered during a power outage, for example, where power bus 802 is not providing power to retail fixture 20. Likewise, products 10 may also include internal batteries that may keep products 10 powered regardless of whether or not they are receiving power from cable-retraction unit 700. In this manner, during a power outage, for example, products 10 may still determine whether or not they are connected to retail fixture 20 and alarm modules 810, 820 may still determine whether or not products 10 are connected to retail fixture 20.

In some embodiments, the communication network described above may be utilized not only to provide security to product 10, but also to diagnose and troubleshoot problems with security system 800. For example, central alarm module 820 and/or products 10 may log data that includes, for example, when alarms were triggered (e.g., time and date) and why alarms were triggered (e.g., a disconnection between cable-retraction unit 700 and product 10). Such information may be used by a technician, for example, in order to guide troubleshooting, to reduce false alarms, and to make system improvements.

Since security system 800 may utilize a chain of communication between devices, the chain of communication may be used to determine problems with security system 800. For example, assume that a retaining cable 500 has broken conductors and is not transmitting data. In a diagnostics mode, for example, central alarm module 820 may send a message to remote alarm module 810 via bus 830, and remote alarm module 810 may receive the message and send a message of receipt to central alarm module 820. Remote alarm module 810 may then send a message to cable-retraction unit 700, and cable-retraction unit 700 may receive the message and send a message of receipt to remote alarm module 810. Cable-retraction unit 700 may then attempt to send a message to processing device 384 (which will not be received, since its broken retaining cable 500 is not transmitting data). If cable-retraction unit 700 does not receive a message of receipt from processing device 384, cable-retraction unit 700 may send a message to central alarm module 820 (e.g., via remote alarm module 810), and central alarm module 820 may log the event. Accordingly, a technician may surmise from the logged event that there may be a problem with retaining cable 500 and/or processing device 384, and may use this information to begin troubleshooting.

Further, product 10 may also be used to diagnose and troubleshoot problems with security system 800. For example, product 10 may send a message to processing device 384, and processing device 384 may receive the message and send a message of receipt to product 10. Then, processing device 384 may attempt to send a message to cable-retraction unit 700 (which will not be received, since its broken retaining cable 500 is not transmitting data). If processing device 384 does not receive a message of receipt from cable-retraction unit 700, processing device 384 may send a message to product 10, and product 10 may log the event. Accordingly, a technician may surmise from the logged event that there may be a problem with retaining cable 500 and/or cable-retraction unit 700, and may use this information to begin troubleshooting. Further, a technician may surmise from event log of product 10 and the event log of central alarm module 820 that both cable-retraction unit 700 and processing device 384 appear to be functioning. Accordingly, the technician may surmise that the problem is likely to lie with retaining cable 500 and may then, for example, replace retaining cable 500.

In some embodiments, products 10 that are not capable of data transmission (e.g., device accessories) may nonetheless be integrated into security system 800. For example, a product 10 may be coupled to retail fixture 20 using a retaining cable having a pressure switch that remains depressed when product 10 is coupled to the retaining cable. The pressure switch may be interconnected to alarm module port 714, and remote alarm module 810 may trigger an alarm if necessary based on changes in the state of the pressure switch.

With reference to FIGS. 11-16B, in some embodiments, retainer 200 may be fixed to display stem 600. A retailer may desire such a configuration to display products 10 that are not intended to be picked up or that are intended to be used when resting upon a surface (e.g., top surface 21).

Figure 11:
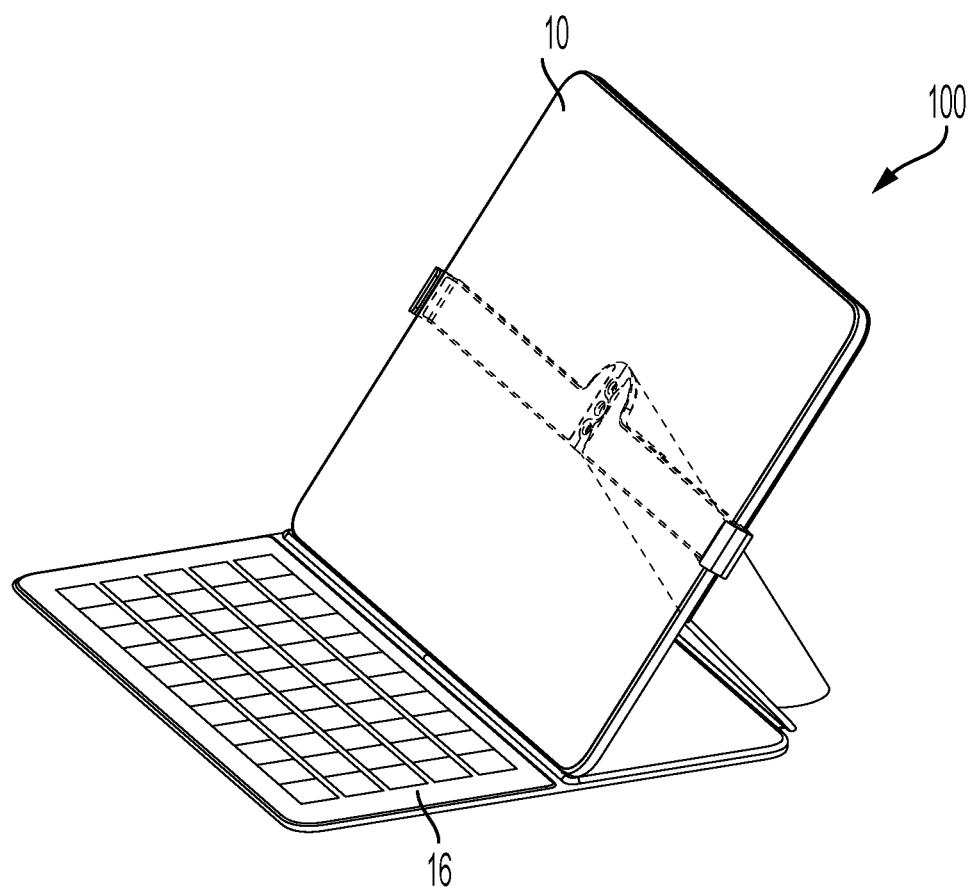
FIG. 11 shows a perspective view of a product-display system.
Figure 12:
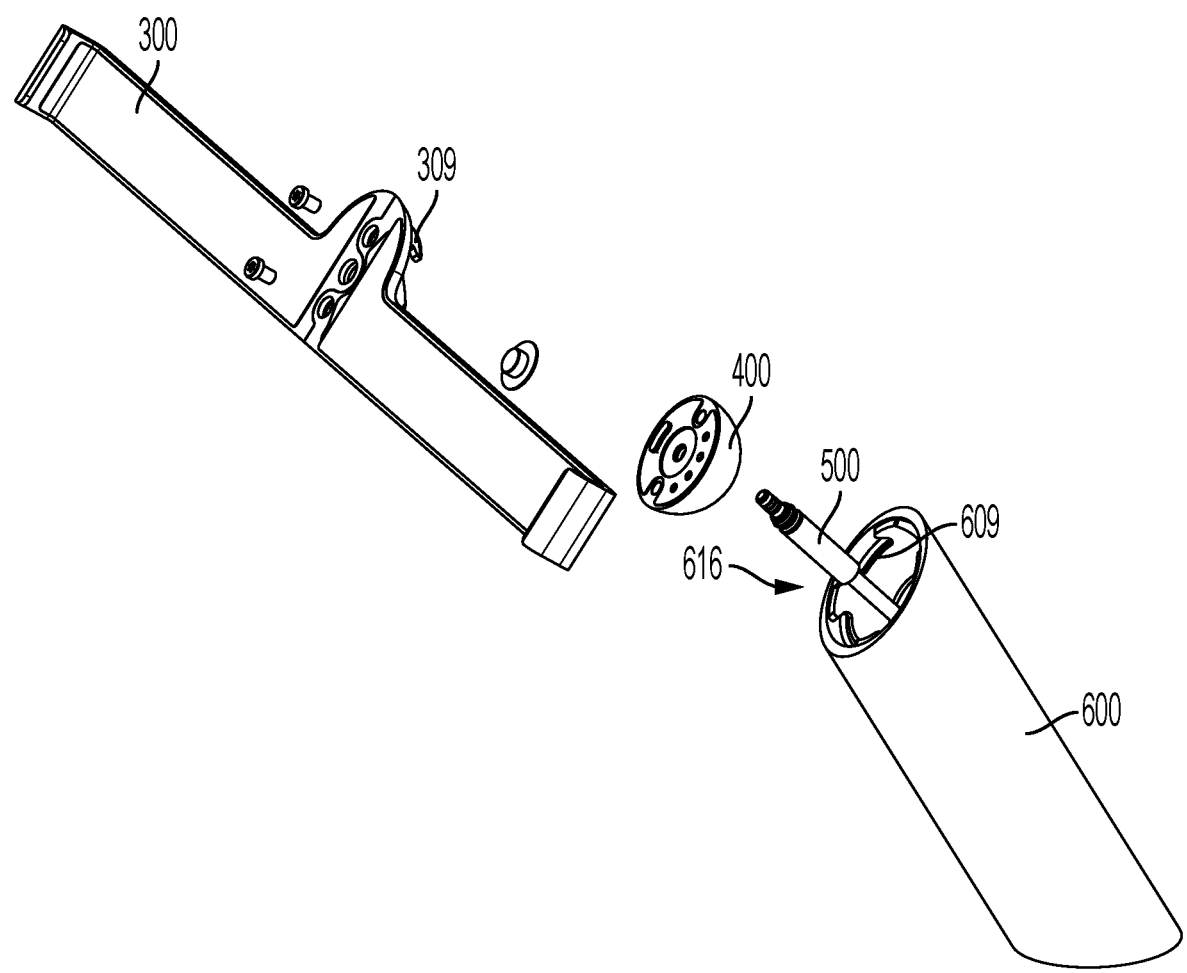
FIG. 12 shows an exploded perspective view of portions of the product-display system of FIG. 11.
Figure 13:
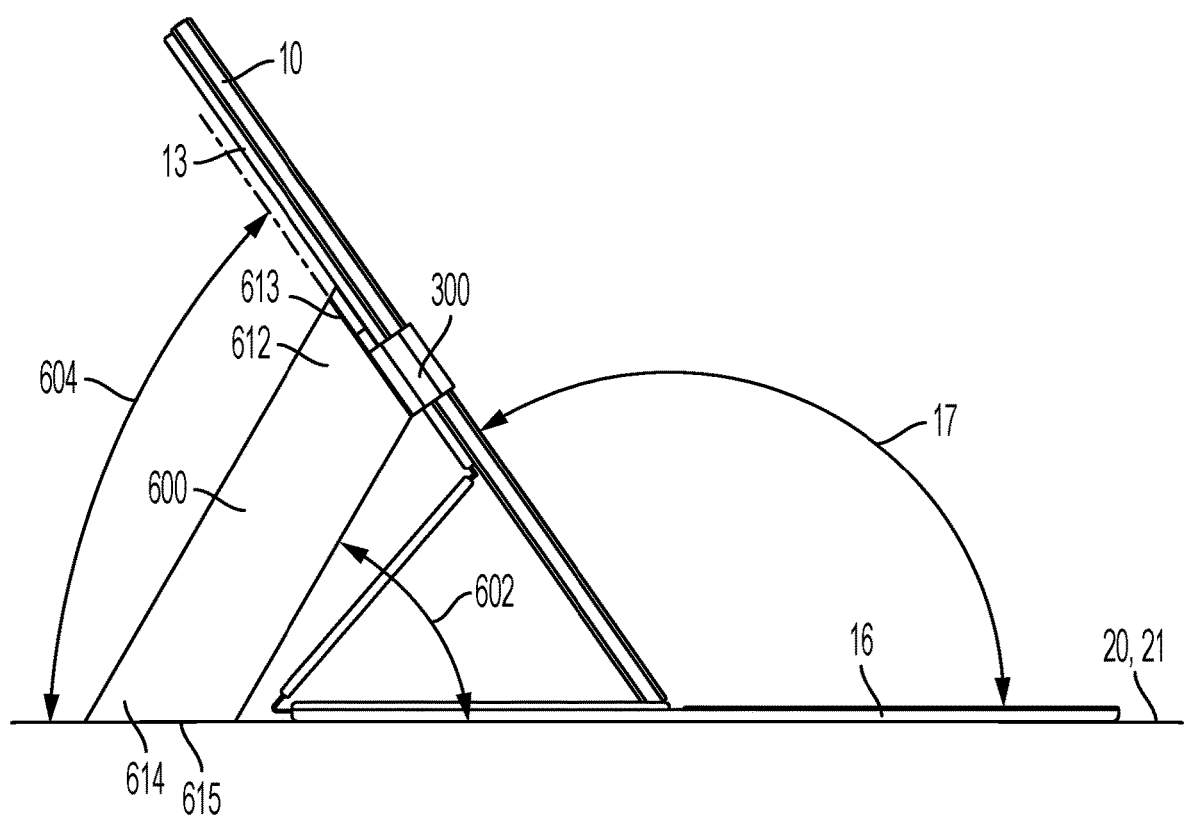
FIG. 13 shows a side view of the product-display system of FIG. 11.
Figure 14:
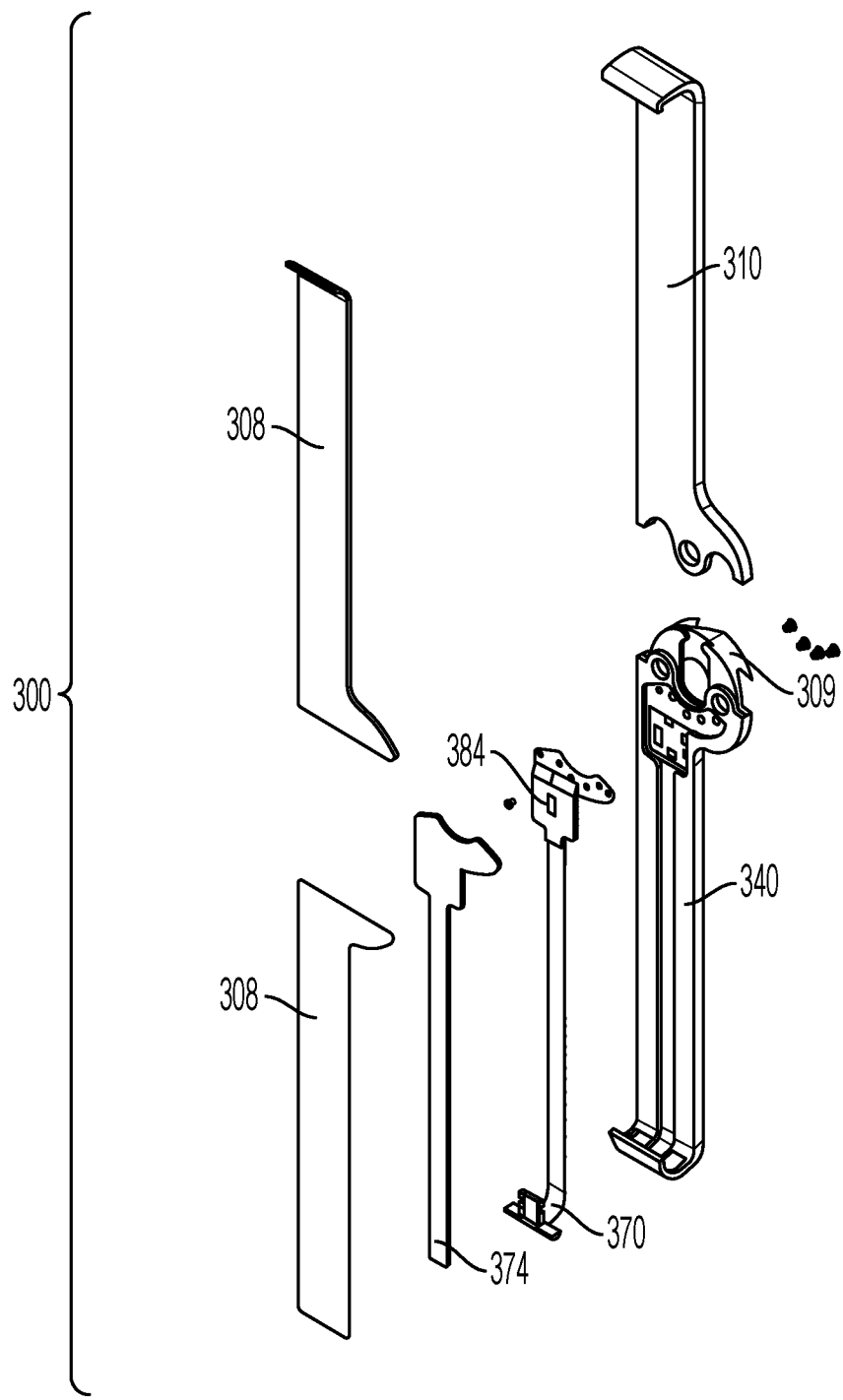
FIG. 14 shows an exploded perspective view of the retainer bracket of FIG. 12.
Figure 15:
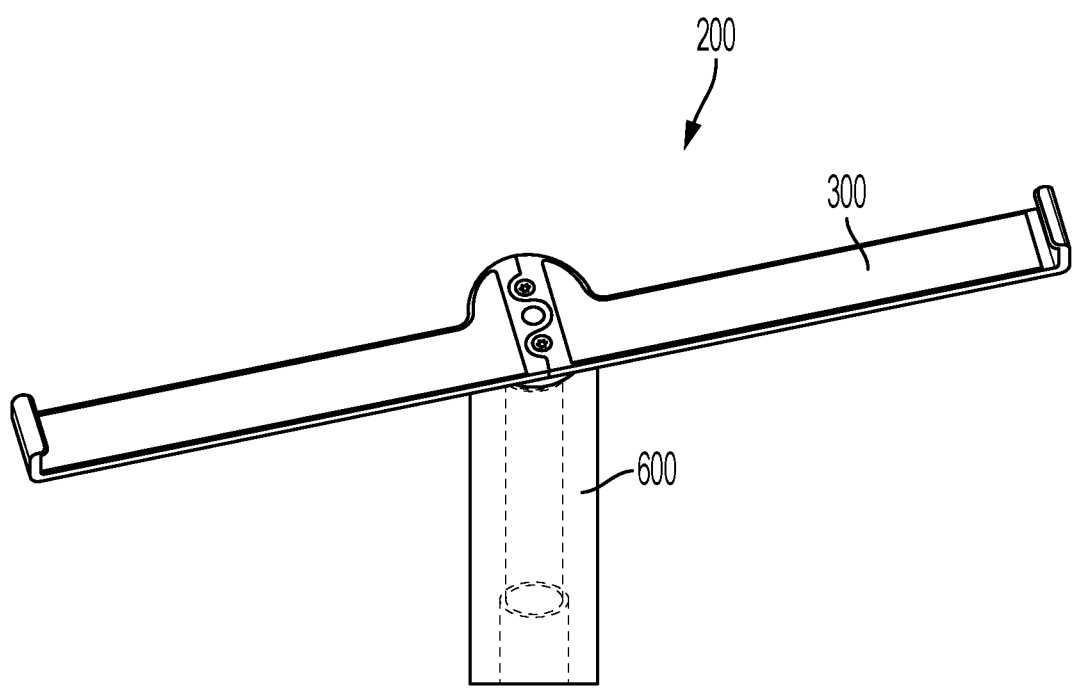
FIG. 15 shows a partially-transparent front view of portions of the product-display system of FIG. 11.
Figure 16A:
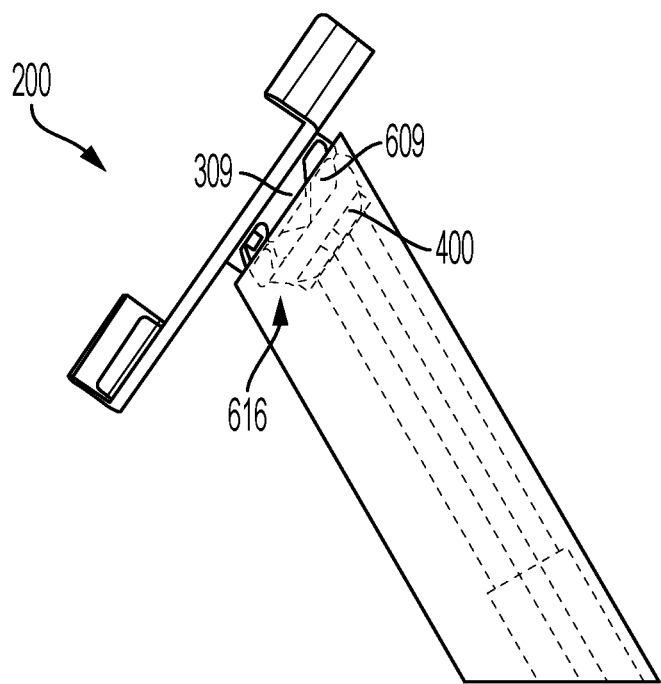
FIG. 16A shows a partially-transparent side view of portions of the product-display system of FIG. 11 in a first state.
Figure 16B:
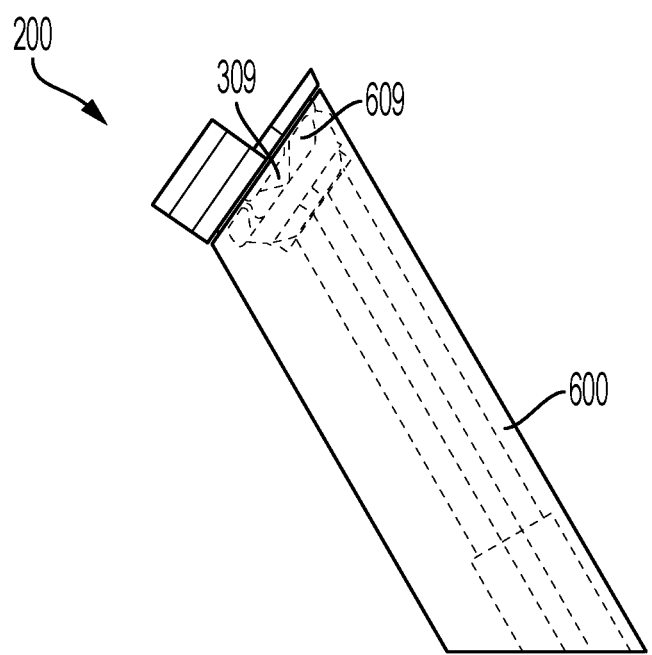
FIG. 16B shows a partially-transparent side view of the portions of the product-display system of FIG. 16A in a second state.

As shown in FIGS. 11 and 13, for example, product 10 may be a tablet computer and may include a keyboard 16. In some examples, during normal use of tablet 10 and keyboard 16, tablet 10 may be positioned at a predetermined angle 17 relative to keyboard 16. Thus, display stem 600 and retainer 200 may be configured to hold tablet 10 and keyboard 16 at a predetermined height and angle such that keyboard 16 may rest flatly upon top surface 21 of retail fixture 20 while tablet 10 is positioned at its predetermined angle 17 relative to keyboard 16 (see, e.g., FIG. 13). In some embodiments, angle 604 and angle 17 are supplementary angles.

In some embodiments, to prevent retainer 200 from being lifted from display stem 600, retainer bracket 300 may include bracket teeth 309 disposed on outer surface 304 of retainer bracket 300. In some embodiments, bracket teeth 309 may extend around retainer body 400. Bracket teeth 309 may correspond to stem teeth 609 that may be disposed in opening 616 or of stem body 610. To couple retainer 200 to display stem 600, retainer body 400 and bracket teeth 309 of retainer 200 may first be inserted into first opening 616 of stem body 610 (see, e.g., FIGS. 15 and 16A). Then, retainer body 400 and bracket teeth 309 may be rotated within opening 616 such that bracket teeth 309 mesh with stem teeth 609 (see, e.g., FIG. 16B), thereby coupling retainer 200 to display stem 600.

Figure 17:
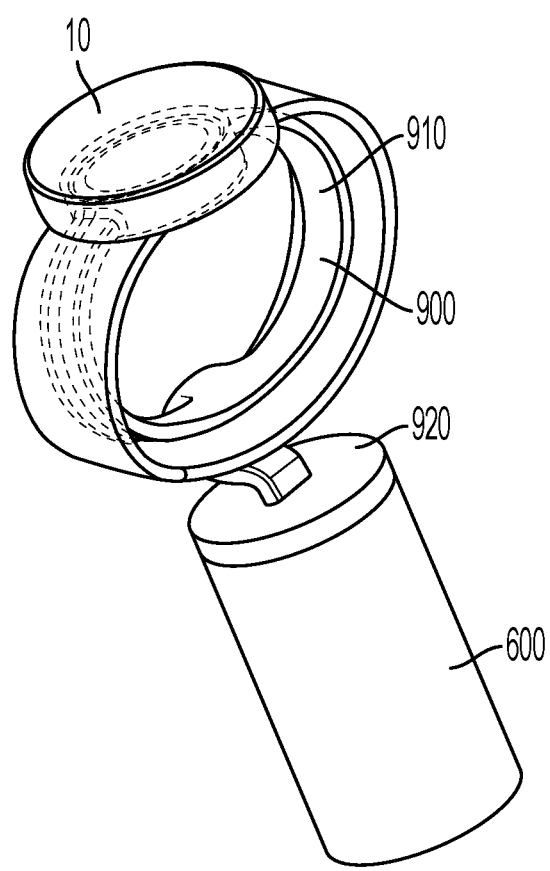
FIG. 17 shows a perspective view of a product-display system.
Figure 18:
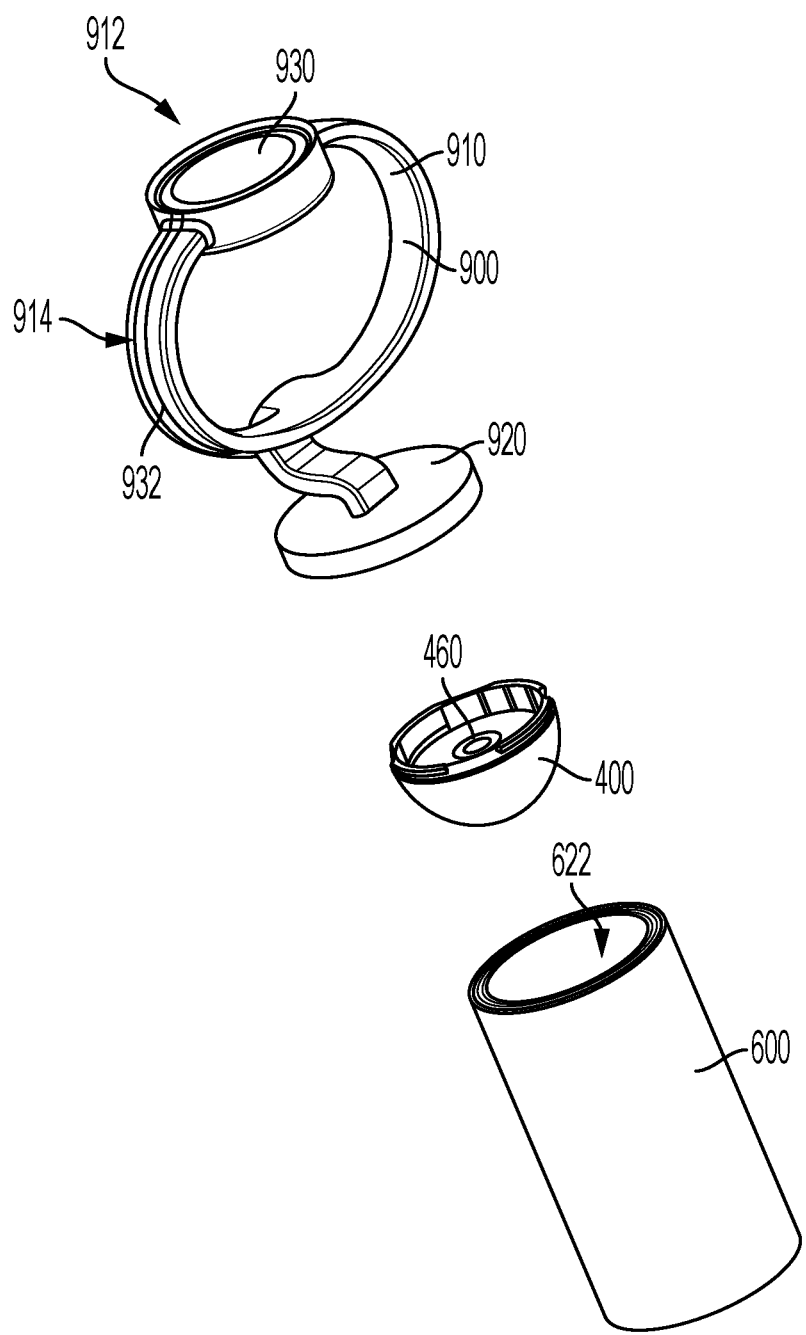
FIG. 18 shows an exploded perspective view of portions of the product-display system of FIG. 17.

As shown in FIGS. 17 and 18, for example, product retainers of product-display system 100 may include configurations that are different than those described above. For example, product-display system 100 may include a product retainer 900. Product retainer 900 may include a product support 910 configured to support and secure a product 10. As shown in FIG. 17, for example, product 10 may be a watch, smartwatch, or the like.

In some embodiments, product support 910 is coupled to a base 920, and base 920 is coupled to retainer body 400. In some embodiments, base 920 is rigidly coupled to display stem 600. In some embodiments, product retainer 900 and retainer body 400 may be lifted from display stem 600 and retained by retaining cable 500 as described above with respect to retainer bracket 300 and retainer body 400.

Product support 910 may include a charger recess 912 configured to receive a charger 930 for providing power to product 10. In some embodiments, product support 910 may also include a cable recess 914 configured to receive a cable 932 of charger 930. In some embodiments, product support 910 may include an internal channel (not shown) through which cable 932 may be extended from charger 930, through product support 910 and into base 920. In some embodiments, cable 932 may include one or more conductors that are electrically coupled directly to cable port 460 of retainer body 400.

In some embodiments, product 10 is secured to product support 910 and/or charger 930 using an adhesive (e.g., an adhesive strip 308, described above). In some embodiments, charger 930 is secured to product support 910 using an adhesive (e.g., an adhesive strip 308, described above).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A product-display system, comprising:
    a retainer for retaining a displayed product, the retainer comprising a retainer body, the retainer body comprising a magnet array, the magnet array comprising:
        a plurality of first magnets disposed radially around a central axis and having alternating positive and negative polar orientations, wherein the magnetic axis of each of the first magnets in the plurality of first magnets is disposed in a radial direction relative to the central axis; and
        a plurality of second magnets disposed radially around the central axis and having alternating positive and negative polar orientations, wherein the magnetic axis of each of the second magnets in the plurality of second magnets is disposed in a tangential direction relative to the central axis,
        wherein first magnets of the plurality of first magnets are disposed adjacent to second magnets of the plurality of second magnets, and wherein at least one second magnet of the plurality of second magnets is disposed between two first magnets of the plurality of first magnets, and at least one first magnet of the plurality of first magnets is disposed between two second magnets of the plurality of second magnets; and
    a display stem having a recess configured to receive the retainer and comprising a magnet array,
    wherein magnetic interaction between the magnet array of the retainer body and the magnet array of the display stem causes rotation of the retainer to at least one predefined orientation when at least a portion of the retainer is disposed within the recess of the display stem, if the retainer is not in the predefined orientation.

2. The product-display system of claim 1, wherein the retainer comprises four and no more than four predefined orientations relative to the display stem.

3. The product-display system of claim 2, wherein the four predefined orientations are separated by 90 degrees of rotation of the retainer body within the recess of the display stand.

4. The product-display system of claim 1, further comprising a retaining cable comprising a plug, wherein the plug is coupled to a port disposed at an opening of the retainer body, and wherein the plug is free to rotate axially in the port relative to the retainer body.

5. The product-display system of claim 1, wherein each of the plurality of first and second magnets in the magnet array of the retainer body comprises a curved outer surface.

6. The product-display system of claim 5, wherein the retainer body further comprises a curved outer surface, wherein the curvature of the outer surface of each of the plurality of first and second magnets in the magnet array of the retainer body is the same as the curvature of at least a portion of the curved outer surface of the retainer body.

7. The product-display system of claim 1, wherein each of the first magnets comprise two opposing flat sides and a curved side disposed between the two flat sides, wherein the two flat sides are disposed parallel to one another.

8. The product-display system of claim 1, wherein each of the second magnets comprise two opposing flat sides and a curved side disposed between the two flat sides, wherein the two flat sides are disposed at an oblique angle relative to one another.

9. The product-display system of claim 1, wherein the retainer body further comprises a second magnet array, wherein the first and second magnet arrays of the retainer body are each arranged in a circular arc centered on the central axis, wherein the first and second magnet arrays of the retainer body are spaced apart from one another, and wherein the first and second magnet arrays of the retainer body are disposed opposite each other across the central axis.

10. The product-display system of claim 1, wherein the magnet array of the display stem comprises:
    a plurality of first magnets disposed radially around a central axis and having alternating positive and negative polar orientations, wherein the magnetic axis of each of the first magnets in the plurality of first magnets is disposed in a radial direction relative to the central axis; and
    a plurality of second magnets disposed radially around the central axis and having alternating positive and negative polar orientations, wherein the magnetic axis of each of the second magnets in the plurality of second magnets is disposed in a tangential direction relative to the central axis,
    wherein first magnets of the plurality of first magnets are disposed adjacent to second magnets of the plurality of second magnets, and wherein at least one second magnet of the plurality of second magnets is disposed between two first magnets of the plurality of first magnets, and at least one first magnet of the plurality of first magnets is disposed between two second magnets of the plurality of second magnets.

11. The product-display system of claim 10, wherein the magnet array of the display stem is arranged in a circle around the central axis.

12. The product-display system of claim 10, wherein each of the plurality of first and second magnets in the magnet array of the display stem comprise a curved outer surface.

13. The product-display system of claim 12, wherein the recess of the display stem comprises a curved outer surface, and wherein the curvature of the outer surface of each of the plurality of first and second magnets in the magnet array of the display stem is the same as the curvature of at least a portion of the curved outer surface of the recess.

14. The product-display system of claim 10, wherein each of the second magnets of the magnet array of the retainer body comprise two opposing flat sides and a curved side disposed between the two flat sides, wherein the two flat sides are disposed at a first oblique angle relative to one another,
    wherein each of the second magnets of the magnet array of the display stem comprise two opposing flat sides and a curved side disposed between the two flat sides, wherein the two flat sides are disposed at a second oblique angle relative to one another, and
    wherein the first and second oblique angles are the same.

15. A display system, comprising:
    a retainer, comprising:
        a retainer bracket configured to secure a displayed product, and
        a retainer body coupled to the retainer bracket and comprising an edge, an opening, and a smooth outer surface extending continuously from the edge to the opening;
    a display stem comprising a recess configured to receive the retainer body, wherein magnetic interaction between a magnet array of the retainer body and a magnet array of the display stem causes rotation of the retainer to at least one predefined orientation when at least a portion of the retainer body is disposed within the recess of the display stem, if the retainer body is not in the predefined orientation;

a retaining cable extending through the display stem and having a first end coupled to the retainer body at the opening;

a cable-retraction unit comprising a cable spool and a cable-biasing mechanism, wherein a second end of the retaining cable is coupled to the cable-retraction unit, wherein the retaining cable is spirally wound onto the cable spool in a single plane, and wherein the cable-biasing mechanism provides a biasing force to the cable, a pulley assembly; and a display surface, wherein the pulley assembly and the display stem are disposed on opposing sides of the display surface, and wherein fasteners extending between the pulley assembly and the display stem secure the display stem to the display surface.

16. The display system of claim 15, further comprising a retained product, wherein the retainer bracket comprises no more than two arms, wherein each arm comprises a hook disposed on an end of the arm, and wherein the product is retained between the hooks of the arms.

17. The display system of claim 16, wherein the arms of the retainer bracket are removably coupled together using a fastener, and wherein the fastener is not visible when the retaining cable is coupled to the retainer body.

18. The display system of claim 16, wherein the retained product is a consumer electronic device, and wherein the device is in electronic communication with the retaining cable through a connector of one of the bracket arms.

19. The display system of claim 18, wherein the connector is not visible when the product is retained by the retainer bracket.

20. The display system of claim 15, wherein when a user lifts the retainer off of the display stem, the cable-biasing mechanism provides a constant tension to the retaining cable as it is unwound from the cable spool, through the maximum extendable length of the retaining cable.

21. The display system of claim 15, wherein when a user lifts the retainer off of the display stem, the retaining cable smoothly unwinds from the cable spool, through the maximum extendable length of the retaining cable.

22. The display system of claim 15, wherein the first end of the retaining cable comprises a plug, wherein the retainer body further comprises a port at the opening for receiving the plug, and wherein the plug is free to rotate axially in the port relative to the retainer body when the retainer is disposed on the display stem and when a user lifts the retainer off of the display stem.

23. The display system of claim 15, wherein the display surface is a display mat.

24. The display system of claim 23, wherein the retaining cable extends over the pulley assembly between the retainer and the cable-retraction unit.

25. The display system of claim 15, wherein an orientation of the retaining cable is changed by the pulley assembly from extending horizontally below the display surface to extending vertically through the display surface and the display stem.

26. The display system of claim 15, wherein at least one of the magnet array of the retainer body and the magnet array of the display stem comprises an arrangement of magnets having a rotating pattern of magnetization that augments a magnetic field on one side of the magnet array and diminishes a magnetic field on an other side of the magnet array.

27. A display system, comprising:

a retainer configured to secure a displayed product, wherein the retainer comprises a first magnet array comprising an arrangement of magnets that generates a magnetic field on one side of the first magnet array that is stronger than a magnetic field generated on an other side of the first magnet array, and a display stem defining a recess configured to receive the retainer, wherein the display stem comprises a second magnet array comprising an arrangement of magnets that generates a magnetic field on one side of the second magnet array that is stronger than a magnetic field generated on an other side of the second magnet array, wherein magnetic interaction between the first magnet array and the second magnet array causes rotation of the retainer to at least one predefined orientation when at least a portion of the retainer is disposed within the recess of the display stem, if the retainer body is not in the predefined orientation;

a retaining cable extending through the display stem and having a first end coupled to the retainer; and a cable-retraction unit comprising a cable spool and a cable-biasing mechanism, wherein a second end of the retaining cable is coupled to the cable-retraction unit, wherein the retaining cable is spirally wound onto the cable spool in a single plane, and wherein the cable-biasing mechanism provides a biasing force to the cable that tends to pull the first magnet array toward the second magnet array.

28. The display system of claim 27, wherein the cable spool comprises an upper portion and a lower portion spaced away from the upper portion by a distance that is less than twice a diameter of the retaining cable so that the retaining cable is spirally wound onto the cable spool between the upper portion and the lower portion in the single plane.

29. The display system of claim 27, wherein the retaining cable is configured to transmit electronic data and power simultaneously to a displayed product.

30. The display system of claim 27, wherein the stronger side of the first magnet array is disposed radially outward, and wherein the stronger side of the second magnet array is disposed radially inward.

* * * * *